(12) United States Patent
Ratilla et al.

(10) Patent No.: US 11,243,514 B2
(45) Date of Patent: Feb. 8, 2022

(54) METHODS, SYSTEMS AND COMPUTER PROGRAM PRODUCTS FOR COMMISSIONING FIELD DEVICES IN A CONTROL SYSTEM

(71) Applicant: Yokogawa Electric Corporation, Tokyo (JP)

(72) Inventors: Jasper Bryan Sale Ratilla, Singapore (SG); Chia Woon Loh, Singapore (SG)

(73) Assignee: YOKOGAWA ELECTRIC CORPORATION, Tokyo (JP)

( * ) Notice: Subject to any disclaimer, the term of this patent is extended or adjusted under 35 U.S.C. 154(b) by 123 days.

(21) Appl. No.: 16/713,084

(22) Filed: Dec. 13, 2019

(65) Prior Publication Data
US 2021/0181720 A1 Jun. 17, 2021

(51) Int. Cl.
*G05B 19/418* (2006.01)
*G06F 11/30* (2006.01)
*G06F 13/38* (2006.01)

(52) U.S. Cl.
CPC ..... *G05B 19/4183* (2013.01); *G05B 19/4185* (2013.01); *G06F 11/3041* (2013.01); *G06F 11/3051* (2013.01); *G06F 13/385* (2013.01)

(58) Field of Classification Search
CPC ............ G05B 19/4183; G05B 19/4185; G05B 19/0426; G05B 2219/25428; G05B 23/0218; G06F 11/3041; G06F 13/385; G06F 11/3051; Y02P 90/02
See application file for complete search history.

(56) References Cited

U.S. PATENT DOCUMENTS

| 6,912,202 | B1 * | 6/2005 | Cooper | H04L 1/24 370/244 |
| 9,807,726 | B1 * | 10/2017 | Nguyen | H04W 4/029 |
| 9,935,821 | B2 * | 4/2018 | Huth | H04L 67/18 |
| 9,942,937 | B1 * | 4/2018 | Siedelhofer | H04W 48/18 |

(Continued)

*Primary Examiner* — Farley Abad
(74) *Attorney, Agent, or Firm* — Sheridan Ross P.C.

(57) ABSTRACT

The invention enables commissioning of field devices within a control system by implementing the steps of (i) detecting a connection event comprising a field device interfacing with an I/O port that is communicably coupled with the server, (ii) retrieving from a memory of the field device that is interfacing with the I/O port, a first field device identifier corresponding to the field device, (iii) retrieving from a non-transient memory database communicably coupled with the server, field device configuration data associated with the I/O port, wherein, the set of field device attributes includes a second field device identifier, and at least a segment of the second field device identifier is different from a corresponding segment of the first field device identifier, (iv) generating one of a translated first field device identifier and a translated second field device identifier, based on predefined translation data, (v) comparing the translated first field device identifier with the second field device identifier, or comparing the first field device identifier with the translated second field device identifier, (vi) generating a connection check output decision based on an output of the comparison, and (vii) optionally, initiate a connection check output event based on the connection check output decision.

23 Claims, 14 Drawing Sheets

(56) References Cited

U.S. PATENT DOCUMENTS

| | | | | |
|---|---|---|---|---|
| 2006/0241913 A1* | 10/2006 | De Groot | .......... | H04L 12/40169 |
| | | | | 702/188 |
| 2014/0067091 A1* | 3/2014 | Vishwanath | ..... | G05B 19/41845 |
| | | | | 700/83 |
| 2016/0170825 A1* | 6/2016 | Nguyen | .............. | G06F 11/0751 |
| | | | | 714/15 |
| 2018/0210428 A1* | 7/2018 | Jundt | ...................... | H04L 67/12 |

* cited by examiner

| Device ID | Signal Name | Connected To | Channel | Slot | Signal Type | Subsystem | Engineering Unit | True Limit | Lower Limit |
|---|---|---|---|---|---|---|---|---|---|
| 12EJX910 | 12EJX910PV1 | IN | | %Z031401 | PV1 | FCS1006 | BAR | 100.0 | 0.0 |
| 12EJX910 | 12EJX910PV15 | IN | | %Z031402 | PV1 | FCS1006 | DEGC | 100.0 | 0.0 |
| 202XA421 | 202XA421 | IN | | %Z036101 | PV1 | FCS1006 | % | 100.0 | 0.0 |
| 30PC01 | 30PC01 | OUT | | %Y011102 | PID | FCS1006 | % | 100.0 | 0.0 |
| 330LI251 | 330LI251 | IN | | %Y011106 | PV1 | FCS1006 | M3/H | 9.0 | 1.0 |
| 3700-PT-242 | 3700PI242 | IN | | %Z031202 | PV1 | FCS1006 | BAR | 100.0 | 0.0 |
| ANALOG | ANALOG | IN | | %Z032101 | PV1 | FCS1006 | % | 100.0 | 0.0 |
| HART-PID2 | HART-PID2 | OUT | | %Y011105 | PID | FCS1006 | % | 100.0 | 0.0 |
| HART-PID3 | HART-PID3 | OUT | | %Y011107 | PID | FCS1006 | % | 100.0 | 0.0 |
| HART-PV1 | HART-PV1 | IN | | %Y011101 | PV1 | FCS1006 | % | 100.0 | 0.0 |
| RMA803 | RM803PV1 | IN | | %Z031201 | PV1 | FCS1006 | % | 100.0 | 0.0 |
| Click here to add new item | | | | | | | | | |

CONNECTION CHECK REPORT

Page 1 / 1
12/18/2019

| TASK: ConnectionCheck 1706-PT-242 | | | |
|---|---|---|---|
| RESULT | Passed | | |
| START | 11/26/2019 2:53:40 PM | END | 11/26/2019 2:53:54 PM |
| REMARKS | New Task | | |
| DEVICE: 1706-PT-242 | | | |
| PD TAG | 1706-PT-242 | DEVICE ID | 594543805C:00000000 |
| VENDOR | YOKOGAWA | DEVICE PATH | M:DP:IT-10086-10311-2 |
| MODEL | EJX | ADDRESS | 0xF7 |
| REVISION | 0x2 | COMM. TYPE | FF-H1 |
| SYSTEM TAG | | | |
| NAME | 1706PR242 | CONNECTION TYPE | IN |
| TERMINAL | SL203.D52 | SH | |
| STATION | FCS1000 | SL | |
| BLOCK TYPE | PID | UNIT | |
| DETAILS | | | |
| STEP 1: COMMUNICATION CHECK | IS DEVICE CONNECTED? | | Yes |
| STEP 2: DEVICE INFORMATION CHECK | THE FOLLOWING DEVICE ITEMS ARE DIFFERENT | | |
| | DEVICE INFO | DB | ACTUAL |
| | ... | ... | ... |
| STEP 3: PHYSICAL CHECK | IS PHYSICAL CHECK - VISUAL CHECK SUCCESSFUL? | | Yes |
| | NUMBER OF RETRIES | | 0 |
| STEP 4: PARAMETER UPDATING | ARE DEVICE PARAMETERS UPDATED? | | Yes |
| REASON FOR RESULT | | | |

METHODS, SYSTEMS AND COMPUTER PROGRAM PRODUCTS FOR COMMISSIONING FIELD DEVICES IN A CONTROL SYSTEM

FIELD OF THE INVENTION

The invention relates to the field of industrial automation and process control systems. More specifically, the invention provides, methods, systems and computer program products that enable field device connection checking during commissioning of field devices within a control system.

BACKGROUND OF THE INVENTION

Industrial environments implement control systems (for example, distributed process control systems) for running and controlling processes for manufacturing, conversion, or production. Control systems typically include one or more process controllers that are connected to one or more field devices. Field devices, may include valves, valve actuators, switches, and transmitters (e.g. temperature, pressure, level, and flow sensors) located within the industrial environment, and which are configured for physical control functions or process control functions. Examples of field device control functions include opening or closing valves, and measuring process and/or environmental parameters (e.g. temperature or pressure) for controlling one or more processes within the process plant or system.

At the other end, a process controller within the control system may be configured to receive signals generated by field devices, wherein the received signals convey information corresponding to process parameters measured by the field devices and/or other information concerning states of the field devices. The process controller may additionally execute a control application that implements one or more control modules for implementing process control decisions. Control modules within the process controller send control signals to field devices through communication lines or connections, to control operation of one or more of the field devices. Input-output (I/O) devices that are located as communication intermediaries between a process controller and one or more field devices enable data transfer and control instruction transfers between the process controller and the field devices, by converting electrical signals to digital values and by sending and receiving such signals over one or more communication protocols.

A control system within a process plant may include one or more process controllers, and each controller is connected to one or more field devices via I/O cards and/or I/O ports. The one or more controllers store control applications and implement control strategies for the control and operation of field devices. The control system may be configured to track or collect data related to the various plant assets or plant equipment, including, but not limited to, field devices, rotating equipment and key machineries. The control system retrievably stores device-related data and/or performance data for all devices or assets in a plant or group of plants, for the purposes of monitoring the statuses and health of plant assets and conducting maintenance work. Additionally, the control system may be configured to serve as a communication intermediary between a plant operator or an operator terminal on one hand, and one or more field devices on the other hand—for the purposes of enabling efficient configuration, commissioning, inspection, and maintenance of such field devices.

For the purposes of the present written description, it will be understood that references to a "field device" may include references to any of valves, valve actuators, switches, transmitters, smart transmitters, positioners, or other sensor devices that may be located within an industrial process environment, and that may be configured for physical or process control functions. Field devices may include "smart" field devices—i.e. devices that support digital communication protocols such as HART or Foundation Fieldbus communication protocols.

For the purposes of the present written description, references to "control system(s)" shall be understood as references to any control system(s) that may be implemented within a process control environment, an industrial plant, or an industrial environment, and shall include distributed control systems (DCS) and/or safety control systems (SCS).

FIG. 1 illustrates a process control environment 100 of a type that may be used for process control within an industrial environment. Process control environment 100 comprises an operator terminal 102, a control system 104, and a field device network 106.

Operator terminal 102 comprises any processor implemented terminal device or client device communicably coupled with control system 104. Operator terminal 102 may be configured to enable an operator to transmit instructions to and receive data from, control system 104.

Control system 104 comprises a control system server 104a, a control system database 104b and a control system gateway interface 104c. Control system server 104a may include at least one processor, and one or more transitory and/or non-transitory memories. Control system server 104a may be configured to implement one or more functions of a process controller discussed above. Control system database 104b may include a non-transitory memory based database, configured to store data records corresponding to field devices, including for example, device parameter data, device configuration data, device description files, and device documents corresponding thereto. Control system gateway interface 104c may include a hardware or software network gateway configured to enable transmission and receipt of communications by control system 104.

During setting up or upgrading of a plant, new field devices are registered, installed and configured within a control system within the plant facility. A conventional process of registering, installing and configuring the field devices within a control system of a plant facility is illustrated in the flowchart of FIG. 2.

Step 202 of FIG. 2 comprises implementing front end engineering design (FEED) for plant construction—wherein FEED focuses on identifying and setting out technical requirements of the new or upgraded control system for entering into the execution phases. Step 204 comprises model selection for field devices which require to be procured for the new or upgraded distributed control system to meet the technical requirements arising out of the FEED.

At step 206, field devices identified during the model selection step are manufactured or procured through vendors. At step 208, the field devices are installed within the plant facility. The installation step includes communicably coupling the field devices with a control system, configuring the field devices for operations within the control system, and configuring the control system and/or software implemented thereon, to control and communicate with the installed field devices. It would be understood for the purposes of this written description that communicably coupling a field device with a control system comprises connecting the field device with an I/O port of the control system. The term "I/O port(s)" refers to a terminating end or a terminating socket of an I/O card that is coupled with a control system—and is intended to represent a broad range of I/O ports known in the art, including but not limited to HART, Foundation Fieldbus I/O ports.

Pre-commissioning of the installed field devices is carried out at step 210. The step of pre-commissioning field devices comprises one or more of equipment inspection, checking of units and facilities against designs, such as the piping and instrumentation diagram (P&ID), flushing, cleaning, pressure testing, functional testing, simulations and other forms of device testing.

Thereafter, step 212 comprises commissioning of the new or upgraded plant facility—which includes a validation and verification process to confirm that the field devices, equipment, facility or industrial plant will perform one or more specified functions according to the design objectives or specifications.

During the pre-commissioning stage (step 210) of a plant, there are pre-commissioning actionables that are typically executed by the EPC (engineering, procurement and construction) consultant/contractor (e.g. the builder of the plant). One of these actionables includes the step of checking that field devices that have been connected to control system I/O ports can be detected at the control system.

This step of checking field devices that have been connected to control system I/O ports is usually one of the first tasks in the list of pre-commissioning tasks performed by an EPC consultant/contractor—and ordinarily occurs post completion of physical wirings in an industrial plant. Other tasks that are carried out as part of the pre-commissioning process, either simultaneously or approximately before or after the connection checking step, include range checks, linearization checks and loop checks.

Field devices are communicably coupled to a control system in a manner such that each field device typically has a one to one connection with an I/O port. Each I/O port is in turn communicably coupled with or linked to a corresponding software function block or software control module that is associated with the I/O port and that is implemented at one or more processors within the control system. The software function block or software control module includes processor implementable instructions for controlling the functionality of the field device through the I/O port. It would therefore be understood that end-to-end, each field device will be linked to or communicably coupled with a corresponding software function block or software control module—and further that each such software function block or software control module is written specifically to control the functionality of a particular field device. The software function block or software control module for each I/O port is configured to operate based on one or more defined "field device specific" parameters. In certain cases, such "field device specific" parameters would permit for proper function of the field device and/or control system, provided they are applied to any field device of a specific field device type—but would not provide a desired or predictable output if applied to a field device on any other field device type. In other cases, such field device specific parameters may only be appropriate if applied to a specific instance of a field device—and would not provide a desired or predictable output if applied to any other field device either of the same field device type or of any other field device type.

It is therefore critical that the commissioning or pre-commissioning process includes the step of verifying that a field device that has been communicably coupled to an I/O port in a control system, is in fact the particular field device that has been specifically identified as being appropriate for being connected to such I/O port, during the engineering design phase of the control system. This ensures that the connected field device is the same device for which the software function block or software control module corresponding to the I/O port has been configured or written—and that the software function block or software control module performs in a predictable and intended manner.

FIG. 3 illustrates a conventional method for checking field devices that have been connected to control system I/O ports.

Step 302 comprises detecting a connection between a field device and an I/O port of a control system. The connection may be detected by a control system—based on a signal generated or transmitted by the field device or by the the I/O port or by an I/O card corresponding to the I/O port, in response to the field device being coupled with the I/O port, and which signal is received at the control system.

At step 304 the control system transmits a connection check request to the field device that has been coupled to the I/O port.

At step 306 the control system receives from the field device, a response to the connection check request—wherein the response typically includes basic information corresponding to the field device, including for example, a physical device tag, manufacturer information, model information, device revision information etc.

At step 308, responsive to the control system receiving an initial response from the field device at step 304, a further physical verification of the field device is undertaken—wherein an operator or other individual is required to (i) visually review a display that is integrated into the field device itself and/or (ii) disconnect the field device—to ascertain that the field device has been properly connected to the I/O port.

The conventional methods in accordance with the teachings of FIG. 3 suffer from multiple drawbacks.

First, such methods only check whether a field device has been physically connected and detected at an I/O port. The methods do not however enable verification that the correct field device has been coupled to the I/O port, and that the field device has therefore been correctly coupled or linked with the software function block or software control module that has been configured to properly control such device. Accordingly, and as is observed in plants with a large number of field devices and I/O ports, there is a likelihood that a field device connected to an I/O port was not intended or designed to be connected to that particular I/O port—and that such field device is therefore incapable of being properly monitored or controlled by the software function block or software control module that controls that particular I/O port.

In such cases, even if prior art methods (of the type described in connection with FIG. 3) for connection checking are fully implemented, the control system or a control system operator has no way of determining whether an incorrect field device has been connected to a particular I/O port. Further, in cases where incorrect device placement or connection is not detected during the pre-commissioning or commissioning stages, monitoring and control of such incorrectly connected field device by the control system is likely to result in unintended or undesirable (and potentially catastrophic) results. As a result, at some stage, when the errors are finally detected, the EPC consultant or contractor will require to trace the problem, and fix it—which can be time consuming and expensive, and more often than not causes further problems, particularly since available time during the pre-commissioning or commissioning stages is scarce.

There is accordingly a need for solutions that enables identification of instances where a field device that has been connected to an I/O port is not the correct field device i.e. is different from the field device which the control system (or software function blocks or software control modules within the control system) has been configured to monitor and/or control through that particular I/O port.

SUMMARY

The invention relates to the field of industrial automation and process control systems. More specifically, the invention provides, methods, systems and computer program products that enable field device connection checking during commissioning of field devices within a control system.

In an embodiment, the invention provides a method for commissioning field devices within a control system that comprises at least one server and a plurality of input-output (I/O) ports communicably coupled with the server. The method comprises (i) detecting a connection event comprising a field device interfacing with an I/O port that is communicably coupled with the server, (ii) retrieving from a memory of the field device that is interfacing with the I/O port, a first field device identifier corresponding to the field device, (iii) retrieving from a non-transient memory database communicably coupled with the server, field device configuration data associated with the I/O port, wherein (a) the set of field device attributes includes a second field device identifier, and (b) at least a segment of the second field device identifier is different from a corresponding segment of the first field device identifier, (iv) generating one or both of a translated first field device identifier and a translated second field device identifier, based on predefined translation data, and (v) initiating generation of an alert on a user interface responsive to determining that (c) the translated first field device identifier does not match the second field device identifier, (d) the translated second field device identifier does not match the first field device identifier, or (e) the translated first field device identifier does not match the translated second field device identifier.

In an embodiment of the method, a rectification action may be implemented responsive to determining that the translated first field device identifier does not match the second field device identifier, or that the translated second field device identifier does not match the first field device identifier, wherein in implementing the rectification action (i) a first field device identifier within a local memory of the field device may be modified or updated, (ii) the field device may be decoupled from the I/O port or (iii) another field device having a first field device identifier that matches the second field device identifier may be coupled at the I/O port in the place of the field device that has a non-matching first field device identifier.

In a method embodiment, the field device configuration data may comprise a subset of engineering data, design data or design specifications corresponding to the process control system.

In another method embodiment, the field device configuration data identifies a set of field device attributes corresponding to a specified field device that has been identified for interfacing with the I/O port.

In a particular method embodiment, the connection event comprises coupling of the field device with the I/O port.

In one embodiment of the method the predefined translation data comprises a translation table or a translation rule.

In a specific embodiment of the method generating the translated first field device identifier includes the step of transforming the first field device identifier based on application of the translation table or translation rule to said first field device identifier.

In another embodiment of the method, generating the translated second field device identifier includes the step of transforming the second field device identifier based on application of the translation table or translation rule to said second field device identifier.

In a further embodiment of the method, the predefined translation data comprises a translation rule for translating a physical device tag or a system tag that is represented by a first expression, to a second expression.

In a particular method embodiment (i) the predefined translation data comprises a translation table, that maps a first set of alphabetical, numeric or alphanumeric strings with a second set of alphabetical, numeric or alphanumeric strings, and (ii) translating a first field device identifier or a second field device identifier based on the translation table, includes (i) identifying within the translation table, a mapping record that enables translation of at least a segment of the first field device identifier or second field device identifier from a first expression to a second expression, and (ii) substituting a segment of said first field device identifier or second field device identifier that matches an identified first alphabetical, numeric or alphanumeric strings within identified mapping record, with a second alphabetical, numeric, or alphanumeric string that is mapped to the first alphabetical, numeric or alphanumeric string within the identified mapping record.

In another embodiment of the method, (i) the predefined translation data comprises a translation table, that maps a first set of alphabetical, numeric or alphanumeric strings that includes one or more than one sub-sets of wildcards with a second set of alphabetical, numeric or alphanumeric strings that also include one or more than one sub-sets of wildcards, (ii) a translated first field device identifier is generated based on the first field device identifier, and (iii) a translated second field device identifier is generated based on the second field device identifier, wherein translating each of the first field device identifier and the second field device identifier includes (i) identifying within the translation table, a mapping record that enables translation of at least a segment of said first field device identifier or said second field device identifier from a first expression to a second expression, and (ii) substituting one or more non-wildcard segment(s) of said first field device identifier or said second field device identifier that matches a first non-wildcard segment within a first alphabetical, numeric or alphanumeric strings within the identified mapping record, with one or more non-wildcard segment(s) within a second alphabetical, numeric, or alphanumeric string that is mapped to the first alphabetical, numeric or alphanumeric string within the identified mapping record.

The invention additionally provides a system for commissioning field devices within a control system that comprises at least one server and a plurality of input-output (I/O) ports communicably coupled with the server. The system for commissioning field devices comprises a memory, and at least one processor, configured for (i) detecting a connection event comprising a field device interfacing with an I/O port that is communicably coupled with the server, (ii) retrieving from a memory of the field device that is interfacing with the I/O port, a first field device identifier corresponding to the field device, (iii) retrieving from a non-transient memory database communicably coupled with the server, field device configuration data associated with the I/O port, wherein (a) the set of field device attributes includes a second field device identifier, and (b) at least a segment of the second field device identifier is different from a corresponding segment of the first field device identifier, (iii) generating one or both of a translated first field device identifier and a translated second field device identifier, based on predefined translation data, and (iv) initiating generation of an alert on a user interface responsive to determining that (c) the translated first field device identifier does not match the second field device identifier, (d) the translated second field device identifier does not match the first field device identifier, or (e) the translated first field device identifier does not match the translated second field device identifier.

The system may be configured to implement a rectification action responsive to determining that the translated first field device identifier does not match the second field device identifier, or that the translated second field device identifier does not match the first field device identifier, wherein in implementing the rectification action (i) a first field device identifier within a local memory of the field device may be modified or updated, (ii) the field device may be decoupled from the I/O port or (iii) another field device having a first field device identifier that matches the second field device identifier may be coupled at the I/O port in the place of the field device that has a non-matching first field device identifier.

The system may be configured such that the field device configuration data is a subset of engineering data, design data or design specifications corresponding to the control system.

In an embodiment of the system, the field device configuration data identifies a set of field device attributes corresponding to a specified field device that has been identified for interfacing with the I/O port.

In another embodiment of the system, the connection event comprises coupling of the field device with the I/O port.

The system may be configured such that the predefined translation data comprises a translation table or a translation rule.

In a particular embodiment of the system, generating the translated first field device identifier includes the step of transforming the first field device identifier based on application of the translation table or translation rule to said first field device identifier.

The system may be configured such that generating the translated second field device identifier includes the step of transforming the second field device identifier based on application of the translation table or translation rule to said second field device identifier.

The system may in another embodiment, be configured such that the predefined translation data comprises a translation rule for translating a physical device tag or a system tag that is represented by a first expression, to a second expression.

In a specific embodiment of the system, (i) the predefined translation data comprises a translation table, that maps a first set of alphabetical, numeric or alphanumeric strings with a second set of alphabetical, numeric or alphanumeric strings, and (ii) translating a first field device identifier or a second field device identifier based on the translation table, includes (i) identifying within the translation table, a mapping record that enables translation of at least a segment of the first field device identifier or second field device identifier from a first expression to a second expression, and (ii) substituting a segment of said first field device identifier or second field device identifier that matches an identified first alphabetical, numeric or alphanumeric strings within identified mapping record, with a second alphabetical, numeric, or alphanumeric string that is mapped to the first alphabetical, numeric or alphanumeric string within the identified mapping record.

In another embodiment of the system, (i) the predefined translation data comprises a translation table, that maps a first set of alphabetical, numeric or alphanumeric strings that each respectively include one or more than one sub-sets of wildcards, with a second set of alphabetical, numeric or alphanumeric strings that also each respectively include one or more than one sub-sets of wildcards, (ii) a translated first field device identifier is generated based on the first field device identifier, and (iii) a translated second field device identifier is generated based on the second field device identifier, wherein translating each of the first field device identifier and the second field device identifier includes (i) identifying within the translation table, a mapping record that enables translation of at least a segment of the said first field device identifier or said second field device identifier from a first expression to a second expression, and (ii) substituting one or more non-wildcard segment(s) of said first field device identifier or said second field device identifier that matches a first non-wildcard segment within a first alphabetical, numeric or alphanumeric strings within the identified mapping record, with one or more non-wildcard segment(s) within a second alphabetical, numeric, or alphanumeric string that is mapped to the first alphabetical, numeric or alphanumeric string within the identified mapping record.

The invention also provides a computer program product for commissioning field devices within a control system that comprises at least one server and a plurality of input-output (I/O) ports communicably coupled with the server. The computer program product comprises a non-transitory computer usable medium having a computer readable program code embodied therein, the computer readable program code comprising instructions for implementing within a processor based computing system, the steps of (i) detecting a connection event comprising a field device interfacing with an I/O port that is communicably coupled with the server, (ii) retrieving from a memory of the field device that is interfacing with the I/O port, a first field device identifier corresponding to the field device, (iii) retrieving from a non-transient memory database communicably coupled with the server, field device configuration data associated with the I/O port, wherein (a) the set of field device attributes includes a second field device identifier, and (b) at least a segment of the second field device identifier is different from a corresponding segment of the first field device identifier, (iv) generating one or both of a translated first field device identifier and a translated second field device identifier, based on predefined translation data, and (v) initiating generation of an alert on a user interface responsive to determining that (c) the translated first field device identifier does not match the second field device identifier, (d) the translated second field device identifier does not match the first field device identifier, or (e) the translated first field device identifier does not match the translated second field device identifier.

BRIEF DESCRIPTION OF THE
ACCOMPANYING DRAWINGS

FIG. 6 illustrates a display interface showing exemplary field device configuration data that is generated in accordance with the method steps of FIG. 4.

FIG. 9B illustrates an exemplary user interface for implementing the step of connection checking, in accordance with an embodiment of the method steps of FIG. 9A.

FIG. 11 illustrates an exemplary connection check report of a type that may be generated as an output of the method steps of FIG. 4.

DETAILED DESCRIPTION

Figure 1:
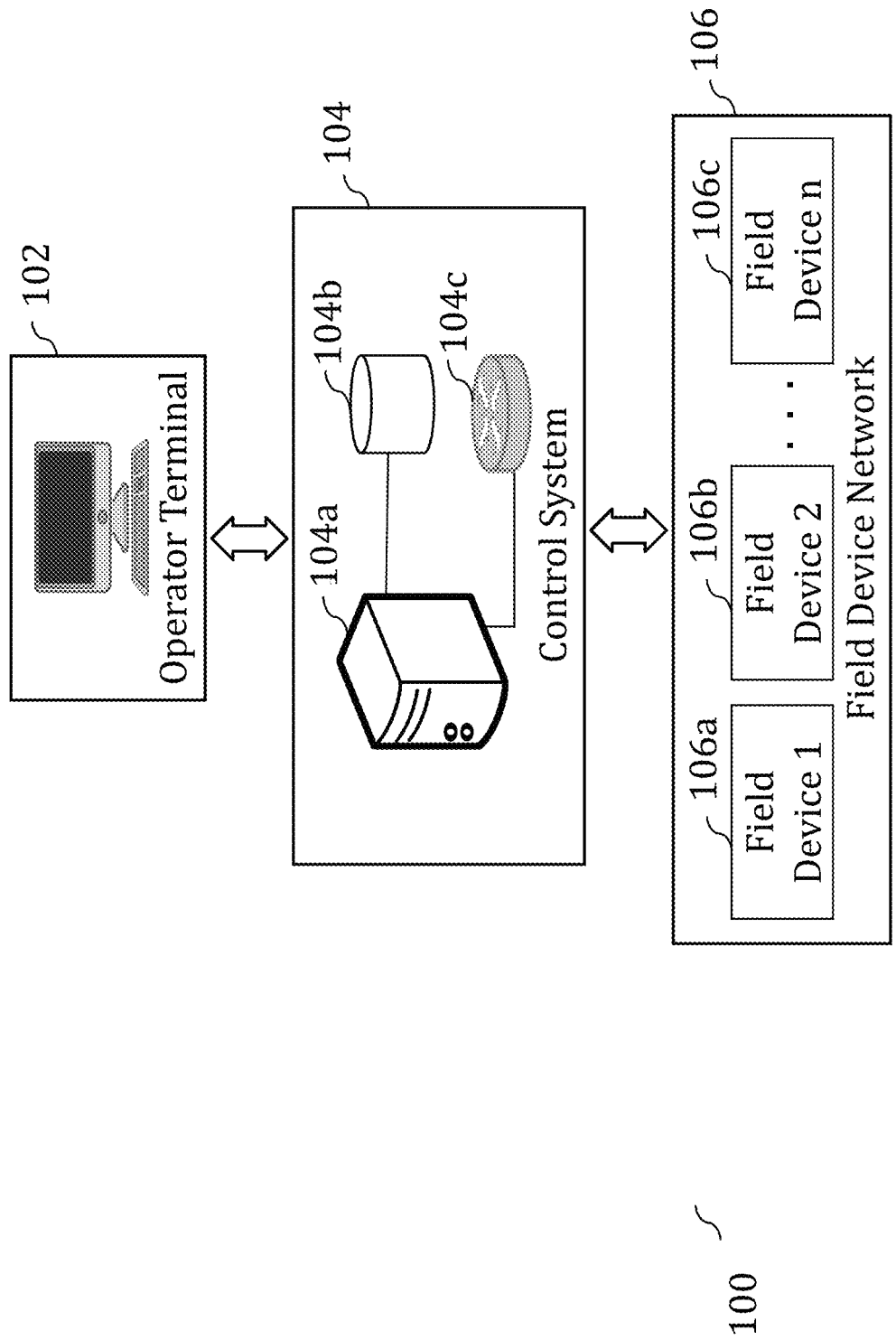
FIG. 1 illustrates a process control environment that is typically found within an industrial plant or environment.
Figure 2:
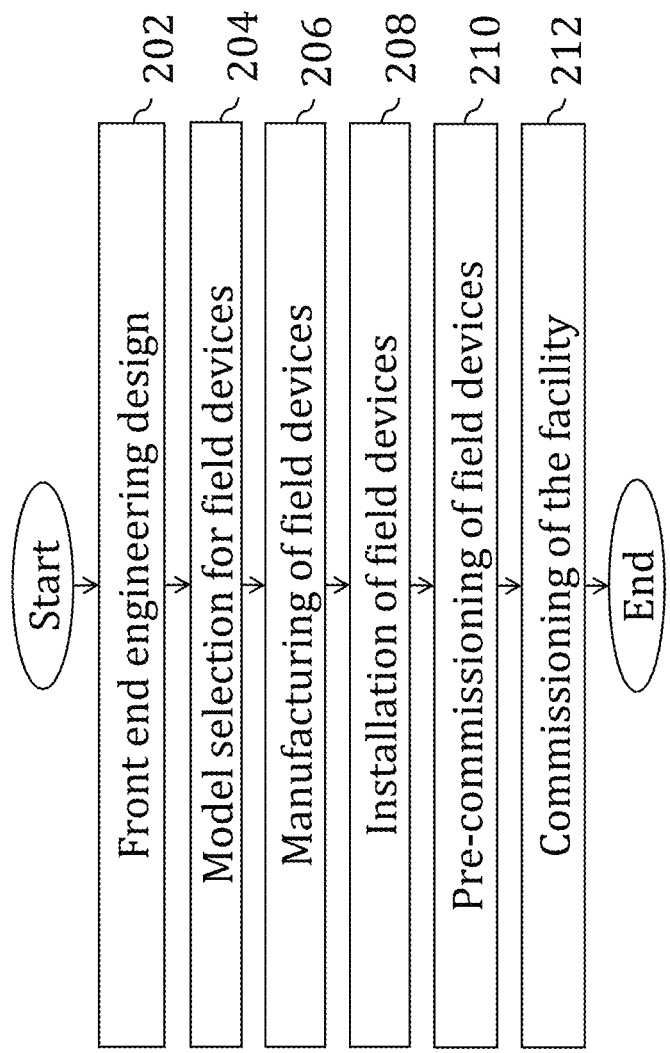
FIG. 2 is a flowchart illustrating a conventional process for upgrading or setting up a plant facility.
Figure 3:
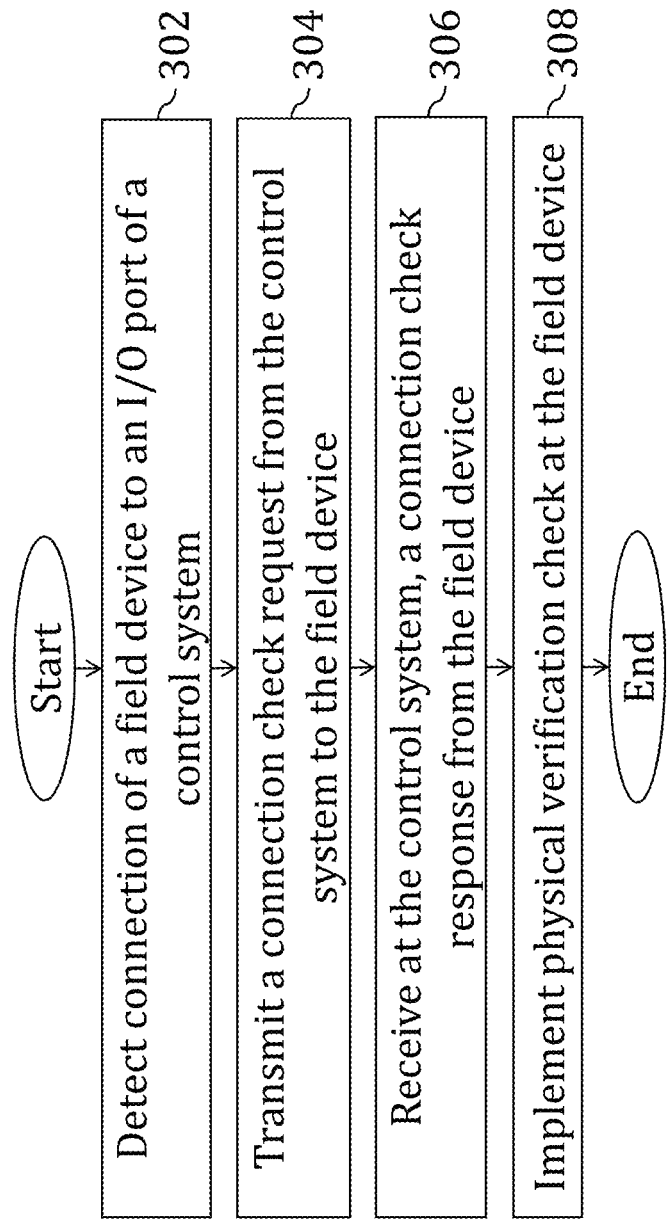
FIG. 3 is a flowchart illustrating a conventional method for implementing a check on field devices that are connected to a control system.

The invention relates to the field of industrial automation and process control systems. More specifically, the invention provides, methods, systems and computer program products that enable field device connection checking during commissioning of field devices within a control system.

For the purposes of the below written description, the terms "field device", and "sensor(s)" may be used interchangeably and shall be understood as referring to a device or component that is configured to monitor or control parameters corresponding to one or more assets, devices, components, tags, hardware, software or data parameters, within an industrial environment.

For the purposes of the below written description, the term "physical device tag" shall mean a device name or device identifier that is associated with an actual field device. Ideally every field device located within an industrial environment or that is coupled with a control system within an industrial environment is provided with a unique physical device tag. Typically, each field device is provided with a local memory, and the physical device tag corresponding to such field device is retrievably stored within the local memory. When a field device is coupled with a control system, the control system can retrieve and read the physical device tag corresponding to the field device, and use such physical device tag as a unique identifier corresponding to the field device, for the purposes of field device operation, control or monitoring.

For the purposes of the below written description, the term "system tag" shall mean a name or identifier that is uniquely associated with a software function block or software control module, within a control system, and which software function block or software control module is configured to control, monitor or interface with a particular field device. Ideally every software function block of software control module that is configured to control, monitor or interface with a field device is provided with a unique system tag. System tags are used by the control system to implement, control and/or operate the corresponding software function block or software control module.

The objective of field device connection checking according to the present invention, is to support evaluation and checking of field devices and their respective connections with a control system. The intended outcome of field device connection checking is to minimize or eliminate field devices being connected at wrong locations and/or incorrect I/O ports within a control system. In various implementations, connection checking can include any one or more of:

COMMUNICATION CHECKING—wherein a control system ascertains whether it can communicate with the field device OBTAINING DEVICE INFORMATION AND PERFORMING TAG COMPARISON—wherein the control system evaluates whether field device information imported from engineering data based on which the control system has been configured, matches field device information retrieved from a field device that has actually been connected to the control system.

PHYSICAL CHECK—wherein the physical location of a field device within an industrial plant is checked—and which may include one or more of:

LCD TEST—wherein a connected field device is triggered by the control system to display one or more items of check data (for example predefined display patterns) on an LCD or other display unit integrated with the connected field device—and wherein an operator visually verifies whether the field device is displaying the check data that has been triggered by the control system.

SQUAWK TEST—wherein a connected field device is triggered by the control system through use of a HART Command 72—which causes the field device to visually indicate, on an LCD or other display unit integrated therewith, that it has received said command.

DISCONNECTION TEST—wherein, in the event the field device in question fails to support both of the LCD TEST and the SQUAWK TEST, the connected field device is disconnected or decoupled—and the control system is checked to see if the field device status has changed from "CONNECTED" to "DISCONNECTED".

As a part of the connection checking processes (specifically, as part of the check involving evaluating whether field device information imported from engineering data based on which the control system has been configured, matches field device information retrieved from a field device that has actually been connected to the control system), it has been found that a particularly efficient method for connection checking is to retrieve a physical device tag from a local memory of a field device that has been connected to an I/O port or I/O card of a control system and to compare the physical device tag with a system tag assigned to a software function block or software control module that has been configured to control a field device connected to said I/O port or I/O card. In the event that the physical device tag and the system tag are found to refer to the same field device, it can be concluded that the field device that has been connected to an I/O port or I/O card is in fact the correct field device that was intended to be connected at that I/O port or I/O card, according to the engineering data or design of the control system.

It is however also found that in many applications, the physical device tag corresponding to a field device that is intended to be connected to an I/O port or I/O card is not an exact match with the system tag that corresponds to the I/O port or I/O card. For example, even where a physical device tag and its corresponding system tag are "substantially similar", there is an observable difference in the "Instrument Type" sub-string(s) between the two.

The term "Instrument Type" refers to the type of measurement that a field device is used for. For example, in the case of a field device that is configured to measure the temperature of fluid in a storage tank, (i) its physical device tag may incorporate an Instrument Type "TT" (which is an abbreviation for "temperature transmitter"), (ii) while the corresponding system tag for this field device may incorporate an Instrument Type "TI" (which is an abbreviation for "temperature indicator").

Accordingly, while an exemplary physical device tag for a temperature sensing field device may comprise the identifier "3100-TT-100", the corresponding system tag associated with an I/O card or I/O port to which the field device is intended to be coupled may comprise the identifier "3100TI100". As a result of such differences even between physical device tags and systems tags that match each other, the step of connection checking based on matching of physical device tags and system tags is not possible through a direct matching of the two. An objective of the present invention is to enable accurate matching of physical device tags and system tags, despite the difference in basic nomenclatures used to name such tags.

A further objective of the present invention is that in response to a determination that system tag information associated with an I/O port, and physical device tag information corresponding to an actual field device physically connected to the I/O port do not match, either the field device can be disconnected or decoupled from the I/O port, or alternatively, physical device tag information that is stored within a local memory of the field device may be modified or updated to match or conform to the system tag information associated with the I/O port, or alternately another field device having a physical device tag that matches the system tag information associated with the I/O port may be coupled at the I/O port in the place of the field device that has a non-matching physical device tag.

Figure 4:
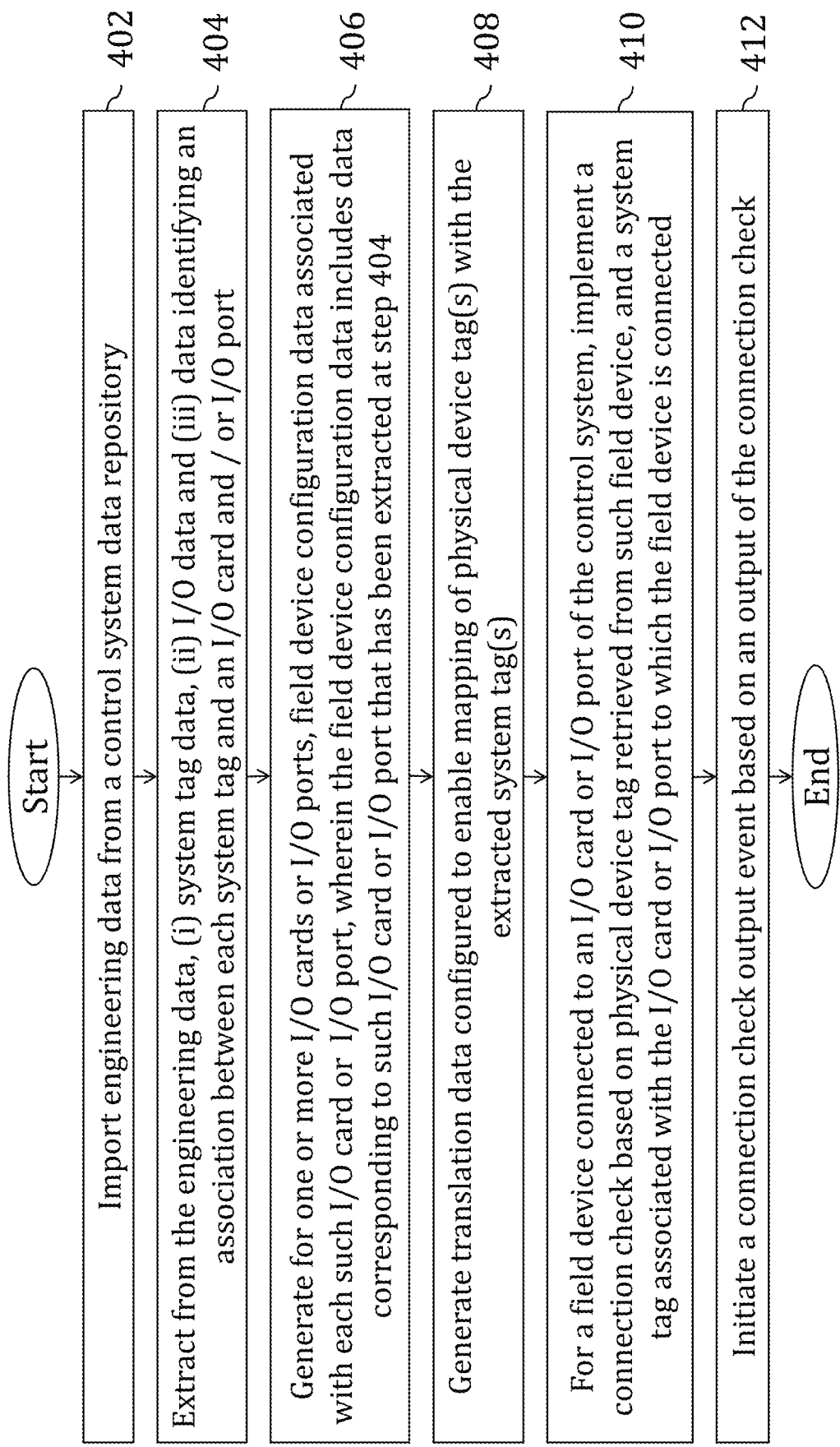
FIG. 4 is a flowchart illustrating a method for implementing a check on field devices that are connected to a control system, that is enabled by the teachings of the present invention.

FIG. 4 is a flowchart illustrating a method for implementing a check on field devices that are connected to a control system.

Figure 5:
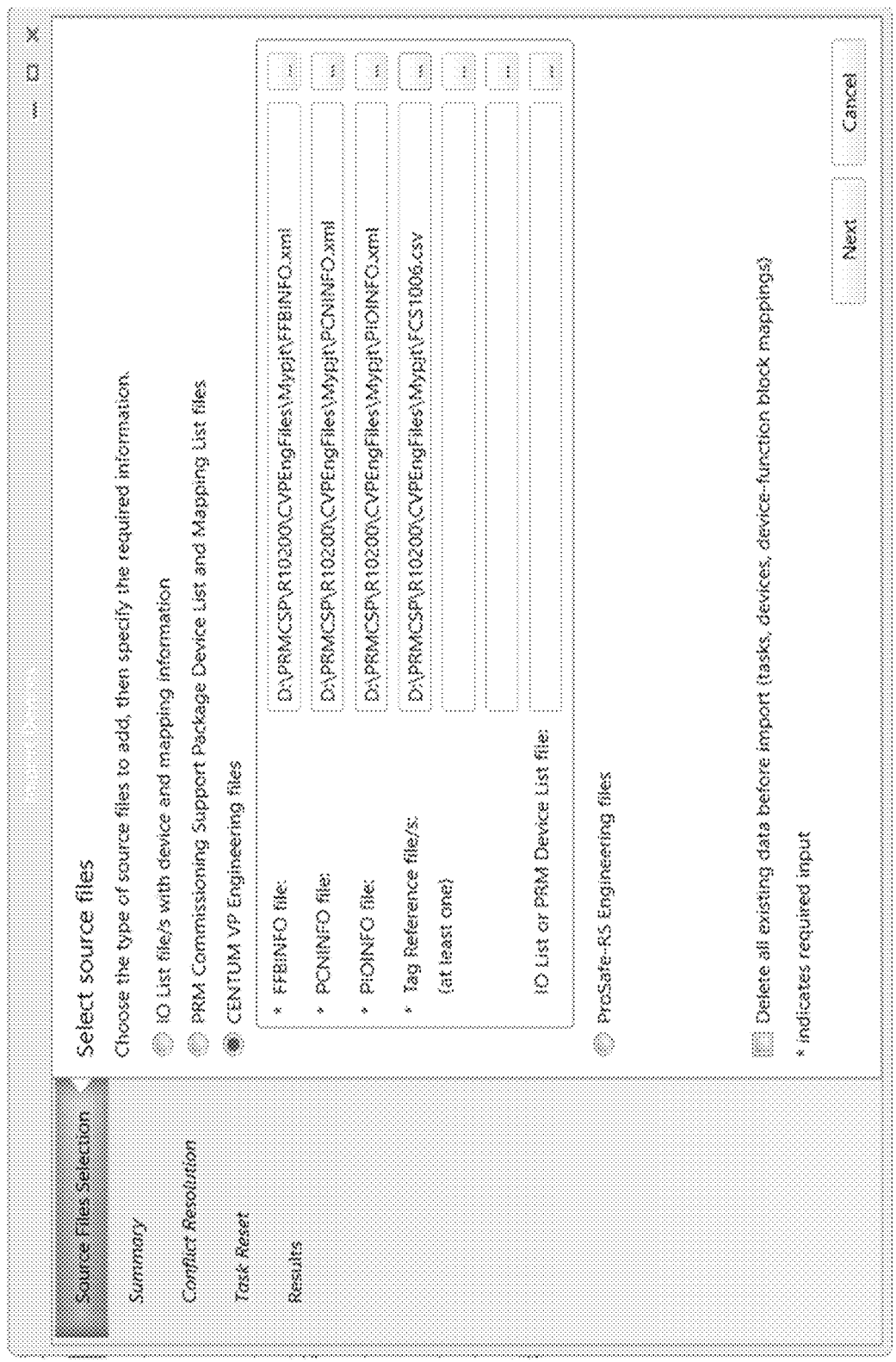
FIG. 5 illustrates an exemplary display interface for importing engineering data for the purposes of the method of FIG. 4.

Step 402 comprises importing engineering data from a control system data repository. Engineering data comprises data defining the design, structure, operation and components of an industrial plant and/or a control system within an industrial plant. Engineering data is defined during the front-end engineering design stage of plant design and construction—and provides the basis on which an industrial plant and/or a control system within an industrial plant is constructed, set-up, configured for operation and/or operated. Engineering data, for the purposes of the present invention shall be understood as including data defining or describing any of the number, types, and communication configuration or operational configurations of one or more control components within a control system, one or more field devices or sensors within a control system and/or one or more data communication devices within a control system. In a particular embodiment of the method of FIG. 4, the engineering data imported at step 402 includes at least an engineering I/O list—which list includes a list of software function blocks or software control modules configured to control one or more field devices, system tag(s) corresponding to such listed software function blocks or software control modules, and information specifying I/O cards and/or I/O ports that are identified for enabling I/O functionality for the respective soft function blocks or software control modules. FIG. 5 is a screenshot 500 of an exemplary display interface that may be used for importing engineering data in step 404 of the method of FIG. 4. As shown in FIG. 5, the interface may be configured to enable import of engineering data from a plurality of engineering data source files—which may be either automatically selected or manually selected or selected based on a combination thereof.

Step 404 comprises extracting from the imported engineering data (i) system tag data, (ii) I/O card data and/or I/O port data, and (iii) data identifying an association between each system tag and an I/O port or I/O card.

The system tag data extracted at step 404 comprises system tags corresponding to one or more software function block(s) or software control module(s) within the control system.

The I/O card data and/or I/O port data extracted at step 404 comprises data identifying I/O cards and/or I/O ports that have been associated with the one or more software function block(s) or software control module(s) corresponding to the system tags extracted at step 402—and which I/O cards and/or I/O ports enable I/O functionality of such respective function blocks or software control modules.

The data identifying an association between each system tag and a corresponding I/O port or I/O card, that is extracted at step 404 may comprise any data or data record that enables a correlation between (i) an identified software function block and/or software control module, and (ii) a corresponding system tag associated with such identified software function block and/or software control module.

Step 406 comprises generating field device configuration data for one or more I/O ports or I/O cards that have been identified based on data extracted at step 404. The generated field device configuration data associated with an I/O port or I/O card includes data corresponding to such I/O port that has been extracted at step 404. In certain embodiments of the method of FIG. 4, field device configuration data associated with an I/O port or I/O card may include any of (i) data identifying a software function block or software control module associated with or linked to the I/O port or I/O card, (ii) system tag data describing a system tag corresponding to a software function block or software control module associated with or linked to the I/O port or I/O card, and (iii) data identifying an association between the I/O port or I/O card, and a system tag corresponding to a software function block or software control module associated with or linked to the I/O port or I/O card.

FIG. 6 illustrates a display interface 600 showing exemplary field device configuration data that is generated in accordance with method step 406 of FIG. 4. As shown in the exemplary embodiment of field device configuration data shown within display interface 600, the field device configuration data generated at step 406 may comprise data records that maps two or more of the following data fields together—(i) a device tag (i.e. a physical device tag corresponding to a field device that is connected with an I/O port or I/O card), (ii) a system tag name (i.e. a system tag corresponding to the software function block or software control module associated with or linked to the I/O port or I/O card, (iii) connection type data (i.e. data specifying a connection type of the relevant field device and/or corresponding function block), (iv) terminal data (i.e. data identifying a terminal number of the system that is connected to the device), (v) block type data (i.e. data identifying a type of the software function block or software control module), (vi) station data (i.e. data identifying the domain and station numbers of the software function block or software control module), (vii) engineering unit data (i.e. data identifying the engineering unit that is used by the software function block or software control module), (ix) upper limit data (i.e. data identifying the scale upper limit value that is set in the software function block or software control module) and (x) lower limit data (i.e. data identifying the scale upper limit value that is set in the software function block or software control module).

Step 408 comprises generating translation data configured to enable mapping of physical device tag(s) with system tag(s) that have been extracted at step 404. The step of generating translation data is necessitated by the fact that physical device tag(s) corresponding to field device(s) that are coupled with an I/O port (i.e. physical device tag(s) that are assigned to individual field device(s) by a device manufacturer or by any other individual/entity (e.g. an operator, end user, EPC contractor etc.) and which are stored within a local memory of the field device), can be different from a system tag that has been assigned to the software function block or software control module that has been designated for controlling, monitoring or operating that field device through an I/O port or I/O card with which the software function block or software control module is communicably coupled or linked.

The difference between a physical device tag for a field device that is intended to be coupled with an I/O port or I/O card, and a corresponding system tag assigned to the software function block or software control module that is communicably coupled or linked with that I/O port or I/O card may be trivial, or may be somewhat more substantial. However it can be generally stated that (i) at least one segment of the physical device tag for a field device that is intended to be coupled with an I/O port or I/O card, is different from a corresponding segment of the system tag for the software function block or software control module that is communicably coupled or linked with that I/O port or I/O card, and (ii) optionally, at least another segment of said physical device tag is identical to a corresponding segment of said system tag. Exemplary Table 1 below includes certain examples of physical device tags and corresponding system tags—with a view to explain the types of differences that are typically observed.

TABLE 1

| Example | Physical Device Tag | System Tag |
| --- | --- | --- |
| Example 1 | 12EJX910 | 12EJX910PVI1 |
| Example 2 | 3100-TT-100 | 3100TI100 |
| Example 3 | RMA803 | RM803PVI1 |

As shown in Example 1 above, the system tag 12EJX910PVI1 that corresponds to physical device tag 12EJX910 includes an additional suffix "PVI1". In Example 2, the system tag include the characters "TI" interpositioned between the numbers 3100 and 100, whereas the corresponding physical device tag includes the characters "-TT-" interpositioned between the numbers 3100 and 100. In Example 3, when comparing system tag RM803PV1 with its corresponding physical device tag RMA803, it can be observed that (i) the physical device tag includes the character "A" interpositioned between "RM" and "803, whereas the corresponding system tag does not include this character "A", and (ii) the system tag includes an additional suffix "PVI1" that is not present in the physical device tag.

As a result of differences between a physical device tag and a corresponding system tag, it is usually not possible to directly match the two to determine whether a field device that has been connected to an I/O port or I/O card corresponds to the system tag that has been assigned to a software function block or software control module that is communicably coupled with or linked with that I/O port or I/O card. The translation data that is generated at step 408 is therefore data that can be used to translate one of a system tag or a physical device tag that is represented by way of a first expression, to a second expression—which second expression can be used to compare the translated system tag with a corresponding physical device tag, or that can be used to compare the translated physical device tag, with a corresponding system tag.

The translation data generated at step 408 may comprise any of:

One or more translation rules that define steps for translating a physical device tag or a system tag that is represented as a first expression, into a second expression which is different from the first expression.

A mapping table that maps a first set of alphabetical, numeric or alphanumeric strings with a second set of alphabetical, numeric or alphanumeric strings—wherein translating a physical device tag or a system tag based on the mapping table, involves (i) identifying within the mapping table, a mapping record that is appropriate to translate the physical device tag or system tag, and (ii) substituting a segment of said physical device tag or system tag that matches an identified first alphabetical, numeric or alphanumeric strings within identified mapping record, with a second alphabetical, numeric, or alphanumeric string that is mapped to the first alphabetical, numeric or alphanumeric string within the identified mapping record.

A mapping table that maps a first set of alphabetical, numeric or alphanumeric strings that includes one or more than one sub-sets of wildcards with a second set of alphabetical, numeric or alphanumeric strings that also include one or more than one sub-sets of wildcards—wherein translating a physical device tag or a system tag based on the mapping table, involves (i) identifying within a mapping table, a mapping record that is appropriate to translate the physical device tag and system tag, and (ii) substituting at least one non-wildcard segment(s) of said physical device tag or system tag that matches a first non-wildcard segment within a first alphabetical, numeric or alphanumeric strings within the identified mapping record, with a second non-wildcard segment(s) within a second alphabetical, numeric, or alphanumeric string that is mapped to the first alphabetical, numeric or alphanumeric string within the identified mapping record.

More detailed explanations regarding translation data that is generated at step 408, and the manner in which such translation data can be used for the purposes of physical device tag translation or system tag translation are provided subsequently in this written description.

Subsequent to generation of translation data (at step 408), step 410 comprises implementing a connection check for each field device that has been coupled with an I/O port or I/O card of the control system. The connection check comprises (i) retrieving a physical device tag from a local memory of the coupled field device, (ii) retrieving a system tag associated with the I/O port or I/O card with which the field device has been coupled, and (iii) implementing a comparison based on the physical device tag and the system tag, to determine whether the physical device tag is the correct field device that requires to be connected to the I/O port or I/O card—wherein a match determination based on a comparison of the physical device tag and the system tag establishes that the correct field device has been coupled with the I/O port or I/O card, and a non-match determination based on a comparison of the physical device tag and the system tag establishes that the correct field device has not been coupled with the I/O port or I/O card.

Step 412 comprises initiating for one or more field devices, a connection check output event, wherein the initiated connection check output event is selected based on the output of a connection check (executed at step 410) for that particular field device. In an embodiment of the method, responsive to the connection check at step 410 resulting in a match determination (i.e. a determination that a correct field device has been coupled with the concerned I/O port or I/O card), the connection check output event comprises presenting on a display or an operator terminal, a connection check report, confirming that a correct field device has been coupled with the concerned I/O port or I/O card. In another embodiment of the method, responsive to the connection check at step 410 resulting in a non-match determination (i.e. a determination that a correct field device has not been coupled with the concerned I/O port or I/O card), the connection check output event comprises presenting on a display or an operator terminal, a connection check report, confirming that a correct field device has not been coupled with the concerned I/O port or I/O card. In yet another embodiment of the method, responsive to the connection check at step 410 resulting in a non-match determination (i.e. a determination that a correct field device has been coupled with the concerned I/O port or I/O card), the connection check output event comprises a rectification action in respect of a field device that has been incorrectly or improperly coupled to the concerned I/O port or I/O card.

The rectification action may include any of (i) updating or modifying a first field device identifier within a local memory of the field device that has been incorrectly or improperly coupled to the concerned I/O port or I/O card, (ii) decoupling from the I/O port, the field device that has been incorrectly or improperly coupled to the concerned I/O port or I/O card, or (iii) coupled at the I/O port, another field device having a first field device identifier that matches the second field device identifier, in the place of the field device that has a non-matching first field device identifier.

FIG. 11 illustrates an exemplary connection check report 1100 of a type that may be generated as part of a connection check output event at step 412. As shown in FIG. 11, the connection check report can communicate to a user or operator, whether a correct field device has been coupled with a particular I/O port or I/O card.

Returning to step 408 of FIG. 4, as discussed above, translation data generated at step 408 may comprise one or more translation rules that define steps for translating a physical device tag or a system tag that is represented as a first expression, into a second expression which is different from the first expression. An illustrative translation rule that serves to explain the function of such translation rules is provided below:

IF the physical device tag includes the sub-string "-TT-" interpositioned between two numeric sub-strings, THEN generate a translated physical device tag by substituting the sub-string "-TT-" with the sub-string "-TI-" within the physical device tag. It would be understood that this illustrative translation rule could be used to translate the physical device tag of Table 1, Example 2 for matching with a corresponding system tag.

In another embodiment of method step 408, the generated translation data may comprise a mapping table or mapping data that maps a first set of alphabetical, numeric or alphanumeric strings with a second set of alphabetical, numeric or alphanumeric strings—wherein translating a physical device tag or a system tag based on the mapping table, involves (i) identifying within a mapping table, a mapping record that is appropriate to translate the physical device tag or system tag (i.e. that enables translation of at least a segment of the physical device tag or system tag from a first expression to a second expression), and (ii) substituting a segment of said physical device tag or system tag that matches an identified first alphabetical, numeric or alphanumeric strings within identified mapping record, with a second alphabetical, numeric, or alphanumeric string that is mapped to the first alphabetical, numeric or alphanumeric string within the identified mapping record.

Figure 7:
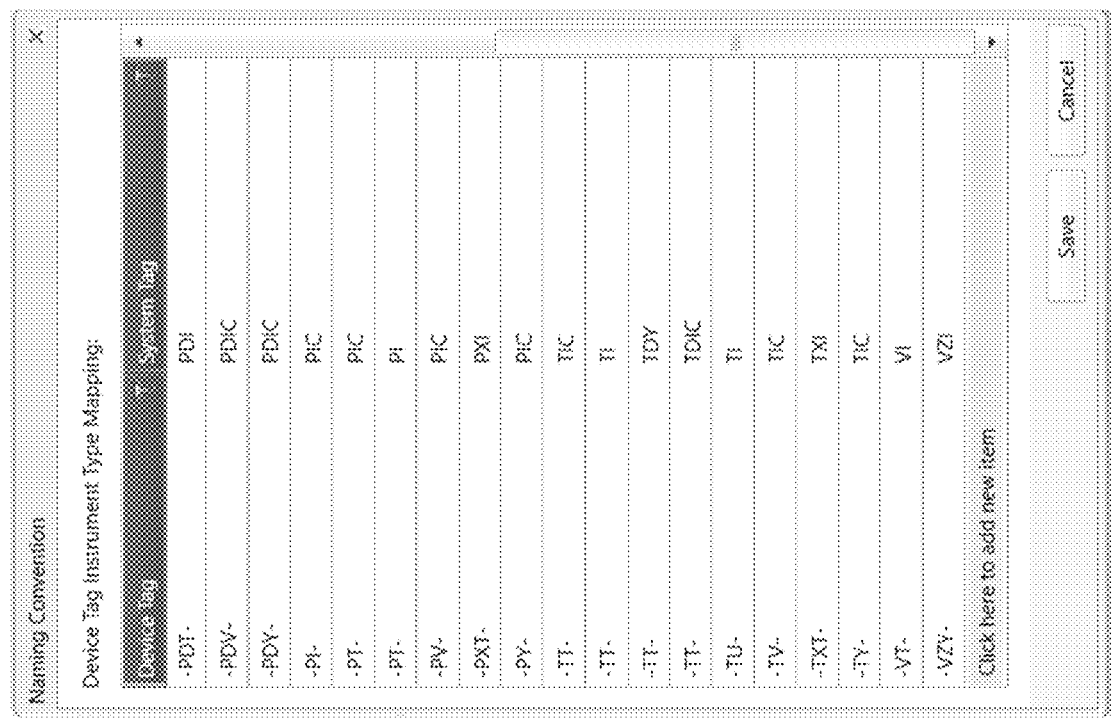
FIG. 7 illustrates a first embodiment of a display interface showing exemplary translation data that is generated in accordance with the method steps of FIG. 4.

FIG. 7 illustrates a display interface 700 showing an exemplary mapping table of the type described immediately hereinabove. As will be seen in FIG. 7, the mapping table maps sub-strings from physical device tags with corresponding sub-strings from system tags—such that (i) a physical device tag can be translated by identifying within the mapping table, a first sub-string that is classified under the column "device tag" which forms part of the physical device tag, (ii) identifying from the mapping table, a second sub-string that is classified under the column "system tag" and which is associated with the identified first sub-string within the mapping table, and (iii) generating a translated physical device tag by substituting within the physical device tag, the identified first sub-string with the identified second sub-string. Considered from another perspective, the mapping table maps sub-strings from system tags with corresponding sub-strings from physical device tags—such that (i) a system tag can be translated by identifying within the mapping table, a first sub-string that is classified under the column "system tag" which forms part of the system tag, (ii) identifying from the mapping table, a second sub-string that is classified under the column "device tag" and which is associated with the identified first sub-string within the mapping table, and (iii) generating a translated system tag by substituting within the system tag, the identified first sub-string with the identified second sub-string.

So for the purposes of an example, if the physical device tag is "1234-PT-7220"—applying the translation data of the mapping table of FIG. 7 would result in the steps of (i) identifying within the mapping table, a first sub-string that is classified under the column "device tag" and which forms part of the physical device tag—which in this case is the first sub-string "PT", (ii) identifying from the mapping table, a second sub-string that is classified under the column "system tag" and which is associated with the identified first sub-string within the mapping table—which in this case is the second sub-string "PI", and (iii) generating a translated physical device tag by substituting within the physical device tag, the identified first sub-string with the identified second sub-string—i.e. generating the translated physical device tag "1234-PI-7220".

Similarly, if the system tag is "1234-PI-7220"—applying the translation data of the mapping table of FIG. 7 would result in the steps of (i) identifying within the mapping table, a first sub-string that is classified under the column "system tag" and which forms part of the physical device tag—which in this case is the first sub-string "PI", (ii) identifying from the mapping table, a second sub-string that is classified under the column "device tag" and which is associated with the identified first sub-string within the mapping table—which in this case is the second sub-string "PT", and (iii) generating a translated physical device tag by substituting within the physical device tag, the identified first sub-string with the identified second sub-string—i.e. generating the translated physical device tag "1234-PT-7220".

In yet another embodiment of method step 408, the generated translation data may comprise a mapping table or mapping data that maps a first set of alphabetical, numeric or alphanumeric strings that includes one or more than one sub-sets of wildcards with a second set of alphabetical, numeric or alphanumeric strings that also include one or more than one sub-sets of wildcards—wherein translating a physical device tag or a system tag based on the mapping table, involves (i) identifying within a mapping table, a mapping record that is appropriate to translate the physical device tag or system tag, and (ii) substituting at least one non-wildcard segment(s) of said physical device tag or system tag that matches a first non-wildcard segment within a first alphabetical, numeric or alphanumeric strings within the identified mapping record, with a second non-wildcard segment(s) within a second alphabetical, numeric, or alphanumeric string that is mapped to the first alphabetical, numeric or alphanumeric string within the identified mapping record.

Figure 8:
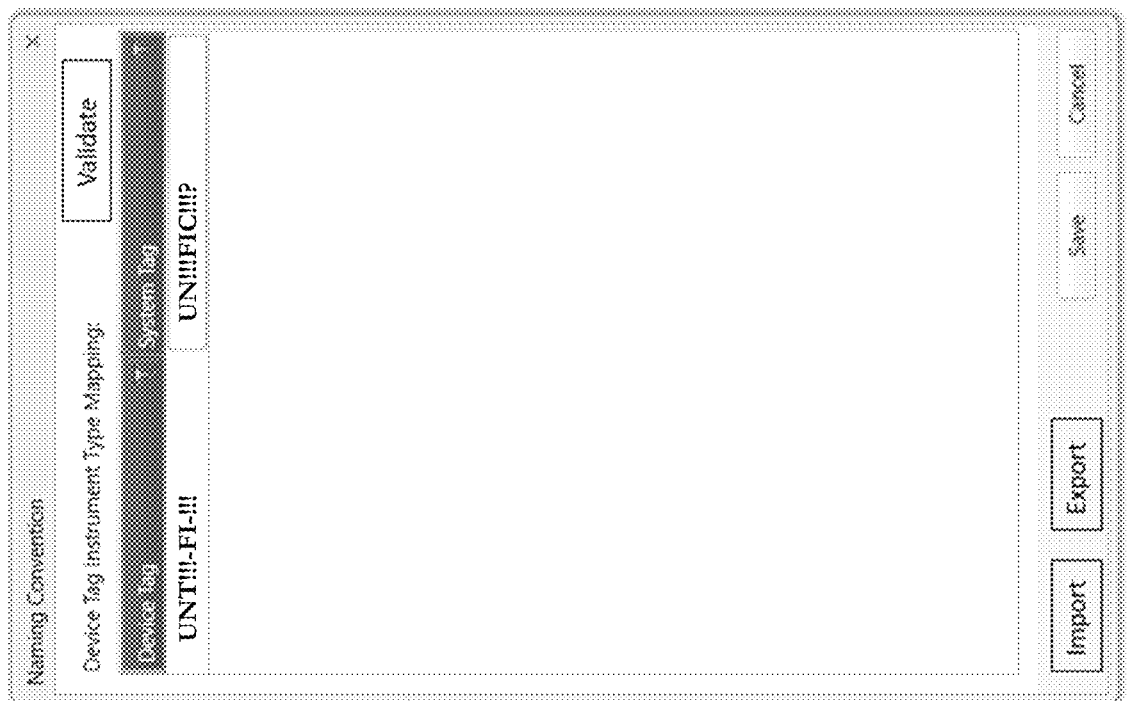
FIG. 8 illustrates a second embodiment of a display interface showing exemplary translation data that is generated in accordance with the method steps of FIG. 4.

FIG. 8 illustrates a display interface 800 showing an exemplary mapping table of the type described immediately hereinabove.

For the purposes of this written description and accompanying Figures, it will be understood that the character "!" is a wildcard representing a single matching numeric character, the character "?" is a wildcard representing any single alphabetical, numeric or special character, and the character "*" is a wildcard representing a string of any length comprising any of alphabetical, numerical or special characters.

As will be seen in FIG. 8, the mapping table maps (i) a hybrid first string expression that comprises a combination of wildcard sub-strings and non-wildcard sub-strings and that represents a generalized expression of a device tag format with (ii) a hybrid second string expression that comprises a combination of wildcard sub-strings and non-wildcard sub-strings and that represents a generalized expression of a system tag format.

In particular, hybrid first string expression illustrated in FIG. 8 comprises the string "UNT!!!-FI-!!!"—comprising in series, a first non-wildcard sub-string comprising three successive non-wild card characters "UNT", a second wildcard sub-string comprising three successive wildcard characters "!!!", a third non-wildcard sub-string comprising four successive non-wildcard characters "-FI-" and a fourth wildcard sub-string comprising three successive wildcard characters "!!!". As a result of the wildcards incorporated into the string expression, the hybrid first string expression represents all strings that comprise, in series, a first non-wildcard sub-string comprising three successive non-wild card characters "UNT", a second wildcard sub-string comprising any three successive alphabetic, numeric or special characters, a third non-wildcard sub-string comprising four successive non-wildcard characters "-FI-" and a fourth wildcard sub-string comprising any three successive alphabetic, numeric or special characters.

Hybrid second string expression illustrated in FIG. 8 comprises the string "UN!!!!FIC!!!"—comprising in series, a first non-wildcard sub-string comprising two successive non-wild card characters "UN", a second wildcard sub-string comprising four successive wildcard characters "!!!!", a third non-wildcard sub-string comprising three successive non-wildcard characters "FIC" and a fourth wildcard sub-string comprising three successive wildcard characters "!!!". As a result of the wildcards incorporated into the string expression, the hybrid second string expression represents all strings that comprise in series a first sub-string comprising two successive non-wild card characters "UN", a second sub-string comprising any four successive alphabetic, numeric or special characters, a third sub-string comprising three successive non-wildcard characters "FIC" and a fourth sub-string comprising any three successive alphabetic, numeric or special characters.

Based on the translation data expressed within the mapping table of FIG. 8, a physical device tag can be translated to generate a translated physical device tag. A process of translating a physical device tag using translation data within the mapping table of FIG. 8 is explained below in connection with an exemplary physical device tag "UNT123-FI-456".

Responsive to receiving a physical device tag ("UNT123-FI-456") for translation, the "device tag" column of the mapping table (of FIG. 8) is searched or parsed for identifying a hybrid first string expression having a generalized expression of a device tag format to which the physical device tag conforms or corresponds. For the purposes of the example, this would result in identification of the hybrid first string expression "UNT!!!-FI-!!!" within the "device tag" column of the mapping table (of FIG. 8), since this hybrid first string expression ("UNT!!!-FI-!!!") provides a generalized expression of the device tag format to which the physical device tag ("UNT123-FI-456") conforms or corresponds.

Thereafter, the column "system tag" of the mapping table (of FIG. 8) is searched or parsed to identify a hybrid second string expression that is associated with the identified hybrid first string expression ("UNT!!!-FI-!!!") within the mapping table. For the purposes of the example, this would result in identification of the hybrid second string expression UN!!!FIC!!!? within the "system tag" column of the mapping table (of FIG. 8), since this hybrid second string expression ("UN-!!!FIC!!!?") is associated with the identified hybrid first string expression ("UNT!!!-FI-!!!") within the mapping table of FIG. 8.

The physical device tag ("UNT123-FI-456") is translated to generate a translated physical device tag by:
identifying a first set of non-wildcard sub-strings within the hybrid first string expression ("UNT!!!-FI-!!!"), and identifying position attributes for each non-wildcard sub-string within the first set of non-wildcard sub-strings. For the purposes of the example, this would result in identification of a first set of non-wildcard sub-strings comprising (a) a first non-wildcard sub-string "UNT" having a position attribute that establishes that is the very first sub-string (i.e. a non-wildcard sub-string) that commences on the left side of the hybrid first string expression ("UNT!!!-FI-!!!"), and (b) a second non-wildcard sub-string "-FI-" having a position attribute that establishes that it a third sub-string counting from the left side of the hybrid first string expression ("UNT!!!-FI-!!!"), and which is positioned immediately to the right of a second wildcard sub-string ("!!!") which is in turn positioned immediately to the right of a first non-wildcard sub-string ("UNT") with which the hybrid first string expression ("UNT!!!-FI-!!!") commences.

identifying a second set of non-wildcard sub-strings within the hybrid second string expression ("UN-!!!FIC!!!?"), wherein each non-wildcard sub-string within the second set of non-wildcard sub-strings has an identical set of position attributes as, a non-wildcard sub-string within the first set of non-wildcard sub-strings (which first set of non-wildcard sub-strings comprises the sub-strings "UNT" and "-FI-"). For the purposes of the example, this would result in identification within the hybrid second string expression ("UN!!!FIC!!!?") of a second set of non-wildcard sub-strings comprising (a) a first non-wildcard sub-string "UN" having a position attribute that establishes that it is the very first sub-string (i.e. a non-wildcard sub-string) that starts on the left side of the hybrid second string expression ("UN-!!!FIC!!!?"), and (b) a second non-wildcard sub-string "FIC" having a position attribute that establishes that it is a third sub-string counting from the left side of the hybrid second string expression ("UN!!!FIC!!!?"), and which is positioned immediately to the right of a second wildcard sub-string ("!!!") which is in turn positioned immediately to the right of a first non-wildcard sub-string ("UN") with which the hybrid second string expression ("UN-!!!FIC!!!?") commences.

identifying a third set of sub-strings within the physical device tag's ("UNT123-FI-456") string expression, wherein each sub-string within the third set of sub-strings is identical (in terms of length and position attributes) to a corresponding non-wildcard sub-string within first set of non-wildcard sub-strings (which first set of non-wildcard sub-strings comprises the sub-strings "UNT" and "-FI-"). For the purposes of the example, this results in identifying a third set of sub-strings within the physical device tag ("UNT123-FI-456"), comprising a first sub-string "UNT" having a 3 character length and a position attribute that establishes that it is a sub-string that starts on the left side of the physical device tag, and a second sub-string "-FI-" having a 4 character length and a position attribute that establishes that it commences after the sixth character counting from the left side of the physical device tag.

generating a translated physical device tag by substituting within the physical device tag ("UNT123-FI-456"), each sub-string within the third set of sub-strings (which third set of non-wildcard sub-strings comprises the sub-strings "UNT" and "-FI-"), wherein substitution comprises removing each sub-string (that is included within the third set of sub-strings) from the physical device tag ("UNT123-FI-456"), and replacing each such removed sub-string within the physical device tag, with a corresponding substitutable sub-string from within the second set of non-wildcard sub-strings (which second set of non-wildcard sub-strings comprises the sub-strings "UN" and "FIC")—wherein each replacement sub-string ("UN" and "FIC") from the second set of non-wildcard sub-strings has an identical set of position attributes as a non-wildcard sub-string that is (a) included within the first set of non-wildcard sub-strings (which first set of non-wildcard sub-strings comprises the sub-strings "UNT" and "-FI-") and (b) that is identical to the sub-string within the third set of sub-strings ("UNT" and "-FI-") that is being replaced within the physical device tag ("UNT123-FI-456"). For the purposes of the example, this results in replacement within the physical device tag ("UNT123-FI-456") of the non-wildcard sub-string "UNT" with "UN" and the non-wildcard sub-string "-FI-" with "FIC"—resulting in translation of the original physical device tag "UNT123-FI-456" into "UN123FIC456".

Conversely, based on the translation data expressed within the mapping table of FIG. 8, a system tag can be translated to generate a translated system device tag. A process of translating a system device tag using translation data within the mapping table of FIG. 8 is explained below in connection with an exemplary system tag "UN123FIC456".

Responsive to receiving a system tag ("UN123FIC456") for translation, the "system tag" column of the mapping table (of FIG. 8) is searched or parsed for identifying a hybrid first string expression having a generalized expression of a system tag format to which the system tag ("UN123FIC456") conforms or corresponds. For the purposes of the example, this would result in identification of the hybrid first string expression "UN!!!FIC!!!?" within the "system tag" column of the mapping table (of FIG. 8), since this hybrid first string expression ("UN!!!FIC!!!?") provides a generalized expression of the system tag format to which the system tag ("UN123FIC456") conforms or corresponds.

Thereafter, the column "device tag" of the mapping table (of FIG. 8) is searched or parsed to identify a hybrid second string expression that is associated with the identified hybrid first string expression ("UN-!!!FIC!!!?") within the mapping table. For the purposes of the example, this would result in identification of the hybrid second string expression "UNT!!!-FI-!!!" within the "device tag" column of the mapping table (of FIG. 8), since this hybrid second string expression ("UNT!!!-FI-!!!") is associated with the identified hybrid first string expression ("UN!!!FIC!!!?") within the mapping table of FIG. 8.

The system tag ("UN123FIC456") is translated to generate a translated system tag by:

identifying a first set of non-wildcard sub-strings within the hybrid first string expression ("UN!!!FIC!!!?"), and identifying position attributes for each non-wildcard sub-string within the first set of non-wildcard sub-strings. For the purposes of the example, this would result in identification of a first set of non-wildcard sub-strings comprising (a) a first non-wildcard sub-string "UN" having a position attribute that establishes that is the very first sub-string (i.e. a non-wildcard sub-string) that commences on the left side of the hybrid first string expression ("UN-!!!FIC!!!?"), and (b) a second non-wildcard sub-string "FIC" having a position attribute that establishes that it a third sub-string counting from the left side of the hybrid first string expression ("UN-!!!FIC!!!?"), and which is positioned immediately to the right of a second wildcard sub-string ("!!!") which is in turn positioned immediately to the right of a first non-wildcard sub-string ("UN") with which the hybrid first string expression ("UN!!!FIC!!!?") commences.

identifying a second set of non-wildcard sub-strings within the hybrid second string expression ("UNT!!!-FI-!!!"), wherein each non-wildcard sub-string within the second set of non-wildcard sub-strings has an identical set of position attributes as, a non-wildcard sub-string within the first set of non-wildcard sub-strings (which first set of non-wildcard sub-strings comprises the sub-strings "UN" and "FIC"). For the purposes of the example, this would result in identification within the hybrid second string expression ("UNT!!!-FI-!!!") of a second set of non-wildcard sub-strings comprising (a) a first non-wildcard sub-string "UNT" having a position attribute that establishes that it is the very first sub-string (i.e. a non-wildcard sub-string) that starts on the left side of the hybrid second string expression ("UNT!!!-FI-!!!"), and (b) a second non-wildcard sub-string "-FI-" having a position attribute that establishes that it is a third sub-string counting from the left side of the hybrid second string expression ("UNT!!!-FI-!!!"), and which is positioned immediately to the right of a second wildcard sub-string ("!!!") which is in turn positioned immediately to the right of a first non-wildcard sub-string ("UNT") with which the hybrid second string expression ("UNT!!!-FI-!!!") commences.

identifying a third set of sub-strings within the system tag's ("UN123FIC456") string expression, wherein each sub-string within the third set of sub-strings is identical (in terms of length and position attributes) to a corresponding non-wildcard sub-string within first set of non-wildcard sub-strings (which first set of non-wildcard sub-strings comprises the sub-strings "UN" and "FIC"). For the purposes of the example, this results in identifying a third set of sub-strings within the system tag ("UN123FIC456"), comprising a first sub-string "UN" having a 2 character length and a position attribute that establishes that it is a sub-string that starts on the left side of the system tag, and a second sub-string "FIC" having a 3 character length and a position attribute that establishes that it commences after the fifth character counting from the left side of the system tag.

generating a translated system tag by substituting within the system tag ("UN123FIC456"), each sub-string within the third set of sub-strings (which third set of non-wildcard sub-strings comprises the sub-strings "UN" and "FIC"), wherein substitution comprises removing each sub-string (that is included within the third set of sub-strings) from the system tag ("UN123FIC456"), and replacing each such removed sub-string within the system tag, with a corresponding substitutable sub-string from within the second set of non-wildcard sub-strings (which second set of non-wildcard sub-strings comprises the sub-strings "UNT" and "-FI-")—wherein each replacement sub-string ("UNT" and "-FI-") from the second set of non-wildcard sub-strings has an identical set of position attributes as a non-wildcard sub-string that is (a) included within the first set of non-wildcard sub-strings (which first set of non-wildcard sub-strings comprises the sub-strings "UN" and "FIC") and (b) that is identical to the sub-string within the third set of sub-strings ("UN" and "FIC") that is being replaced within the system tag ("UN123FIC456"). For the purposes of the example, this results in replacement within the system tag ("UN123FIC456") of the non-wildcard sub-string "UN" with "UNT" and of the non-wildcard sub-string "FIC" with "-FI-"-resulting in translation of the original system tag "UN123FIC456" into "UNT123-FI-456".

While FIG. 8 represents a specific instance of mapping of hybrid string expressions, it would be understood that these are not intended to be exhaustive, and certain other examples of appropriate wildcard-based mappings are provided below in connection with Tables 2 to 4.

If the Physical Device Tag is "UNT200-FI-101" and the corresponding System Tag is "UN200FIC101", then appropriate translation data for achieving the necessary translation can be achieved through the following mapping expression in Table 2.

TABLE 2

| Device Tag | System Tag |
| --- | --- |
| UNT!!!-FI-!!! | UN!!!FIC!!! |
| UNT*-FI-* | UN*FIC* |

If the Physical Device Tag is UNT200-FI-101 and there are corresponding multiple System Tags "UN200FIC101A", "UN200FIC101B" and "UN200FIC101C", then appropriate translation data for achieving the necessary translation can be achieved through the following mapping expression in Table 3.

TABLE 3

| Device Tag | System Tag |
| --- | --- |
| UNT!!!-FI-!!! | UN!!!FIC!!!? |

If the Physical Device Tag is UNT-LAB-200-FI-101 and there are corresponding System Tag is UN200FIC101, then appropriate translation data for achieving the necessary translation can be achieved through the following mapping expression in Table 4.

TABLE 4

| Device Tag | System Tag |
| --- | --- |
| UNT-LAB-!!!-FI-!!! | UN!!!FIC!!! |

Figure 9A:
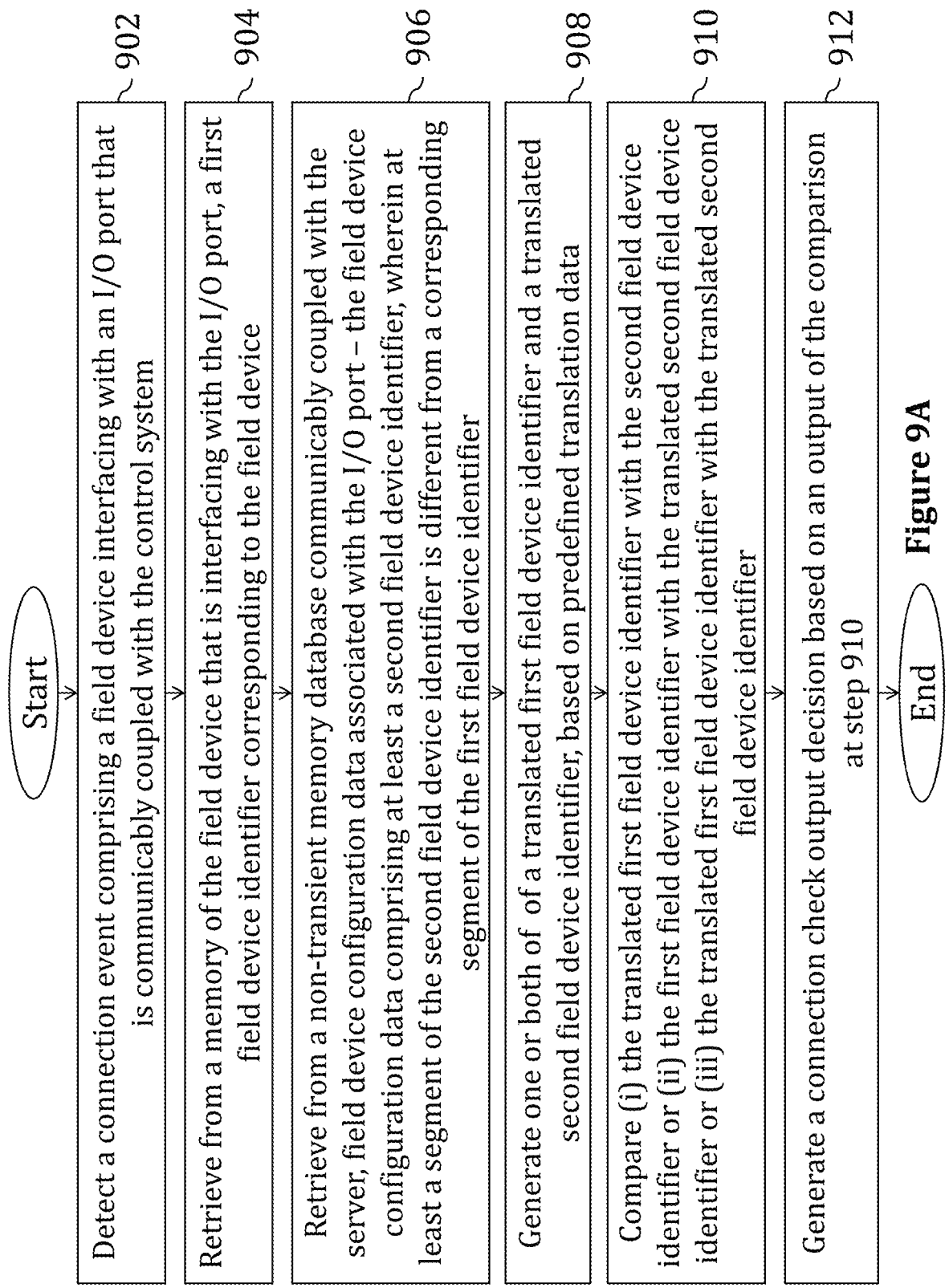
FIG. 9A is a flowchart describing a specific embodiment of the step of connection checking in accordance with the method steps of FIG. 4.

FIG. 9A is a flowchart describing a specific embodiment of the step of connection checking in accordance with the method steps of FIG. 4—i.e. an embodiment for implementing method step 410 of FIG. 4. In an embodiment of the invention, one or more of the steps of the method of FIG. 9A may be implemented at a control system server or control system processor.

Step 902 comprises detecting a connection event—the connection event comprising a field device interfacing with an I/O port that is communicably coupled with the control system. Detection of the connection event may occur in any number of ways, including in an embodiment, by a control system processor or control system server receiving an electric signal or data signal from the I/O port or I/O card (that is coupled with the I/O port) notifying the control system process or control system server that a field device is presently coupled with or is interfacing with said I/O port (or I/O card).

Step 904 comprises retrieving from a local memory of the field device that is interfacing with the I/O port, a first field device identifier corresponding to the field device. In an embodiment, the first field device identifier retrieved from the local memory of the field device comprises a physical device tag—of a type that has been described above.

Step 906 comprises retrieving from a non-transient memory database communicably coupled with the control system processor or control system server, field device configuration data associated with the I/O port (or with an I/O card that controls, monitors or interfaces with the I/O port). The field device configuration data retrieved at step 904 may comprise any field device configuration data of a type discussed above in connection with step 406 of FIG. 4. In a particular embodiment, the retrieved field device configuration data comprises one or more of (i) data identifying a software function block or software control module associated with or linked to the I/O port (or I/O card that controls or monitors the I/O port) (ii) system tag data describing a system tag corresponding to a software function block or software control module associated with or linked to the I/O port or I/O card, and (iii) data identifying an association between the I/O port or I/O card, and a system tag corresponding to a software function block or software control module associated with or linked to the I/O port or I/O card. In a particular embodiment, the field device configuration data comprises at least a second field device identifier, wherein at least a segment of the second field device identifier is different from a corresponding segment of the first field device identifier. In an embodiment, the second field device identifier retrieved at step 906 is a system tag uniquely associated with a software function block or software control module that controls, monitors or interfaces with the I/O port. For the purposes of the method illustrated in FIG. 9A, it would be understood that the system tag retrieved at step 906 is different from the physical device tag at step 904 in terms of one or more component sub-strings.

Step 908 comprises generating one or both of a translated first field device identifier and a translated second field device identifier, based on predefined translation data. The translation data used for generating a translated identifier at step 908 may comprise any translation data of the kind discussed in connection with step 408 of FIG. 4, and the methods of generating a translated identifier based on such predefined translation data may comprise any method that would be apparent to the skilled person—and in specific embodiments, may include any of the methods of translation that have been discussion in connection with step 408 of FIG. 4. In an embodiment of step 908 where the translation data used for generating translated identifiers comprises one or more translation rules that define steps for translating a physical device tag or a system tag, step 908 may comprise generating one of a translated first field device identifier and a translated second field device identifier, based on the translation rule(s). In an embodiment of step 908 where the translation data used for generating translated identifiers comprises a mapping table that maps a first set of alphabetical, numeric or alphanumeric strings with a second set of alphabetical, numeric or alphanumeric strings, step 908 may comprise generating one of a translated first field device identifier and a translated second field device identifier, based on the mapping table. In an embodiment of step 908 where the translation data used for generating translated identifiers comprises a mapping table that that maps a first set of alphabetical, numeric or alphanumeric strings that includes one or more than one sub-sets of wildcards with a second set of alphabetical, numeric or alphanumeric strings that also include one or more than one sub-sets of wildcards, step 908 comprises generating both of a translated first field device identifier and a translated second field device identifier, based on the mapping table. In specific embodiments of step 908, (i) where a translated first field device identifier is generated, the first field device identifier may comprise a physical device tag retrieved from a local memory of the field device, and the translated first field device identifier is generated by translating the physical device tag using the predefined translation data and/or (ii) where a translated second field device identifier is generated, the second field device identifier may comprise a system tag uniquely associated with a software function block or software control module that controls, monitors or interfaces with the I/O port, and the translated second field device identifier is generated by translating the system tag using the predefined translation data.

Step 910 comprises comparing (i) the translated first field device identifier with the second field device identifier, or (ii) the first field device identifier with the translated second field device identifier or (iii) the translated first field device identifier with the translated second field device identifier.

In an embodiment of the method where step 908 comprises generating only a translated first field device identifier (for example based on a set of translation rules, or based on a mapping table that maps a first set of alphabetical, numeric or alphanumeric strings with a second set of alphabetical, numeric or alphanumeric strings), step 910 comprises comparing the translated first field device identifier with the second field device identifier—for the purposes of identifying a match between the two. In an embodiment of the method where step 908 comprises generating only a translated second field device identifier (for example based on a set of translation rules, or based on a mapping table that maps a first set of alphabetical, numeric or alphanumeric strings with a second set of alphabetical, numeric or alphanumeric strings), step 910 comprises comparing the first field device identifier with the translated second field device identifier—for the purposes of identifying a match between the two. In an embodiment of the method where step 908 comprises generating both of a translated first field device identifier and a translated second field device identifier (based on a mapping table that that maps a first set of alphabetical, numeric or alphanumeric strings that includes one or more than one sub-sets of wildcards with a second set of alphabetical, numeric or alphanumeric strings that also include one or more than one sub-sets of wildcards), step 910 comprises comparing the translated first field device identifier with the translated second field device identifier—for the purposes of identifying a match between the two.

So, in one embodiment, where the first field device identifier is a physical device tag, and the second field device identifier is a system tag, and where translation step 908 results in generation of a translated physical device tag (for example, a translation of the original physical device tag, based on a set of translation rules, or based on a mapping table that maps a first set of alphabetical, numeric or alphanumeric strings with a second set of alphabetical, numeric or alphanumeric strings), step 910 comprises comparing the translated physical device tag with the retrieved system tag—to identify whether the two match or do not match. In an alternate embodiment, where the first field device identifier is a physical device tag, and the second field device identifier is a system tag, and where translation step 908 results in generation of a translated system tag (for example, a translation of the original system tag, based on a set of translation rules, or based on a mapping table that maps a first set of alphabetical, numeric or alphanumeric strings with a second set of alphabetical, numeric or alphanumeric strings), step 910 comprises comparing the retrieved physical device tag with the translated system tag—to determine whether the two match or do not match. In yet another embodiment, where the first field device identifier is a physical device tag, and the second field device identifier is a system tag, and where translation step 908 results in generation of both of a translated physical device tag and a translated system tag (for example, a translation of both tags that is based on a mapping table that that maps a first set of alphabetical, numeric or alphanumeric strings that includes one or more than one sub-sets of wildcards with a second set of alphabetical, numeric or alphanumeric strings that also include one or more than one sub-sets of wildcards), step 910 comprises comparing the translated physical device tag with the translated system tag—to determine whether the two match or do not match. It would be understood that the comparison at step 910 may be implemented through any comparison methods that would be apparent to the skilled person—including any of the comparison methods that have been discussed above in connection with the methods of FIG. 4.

Step 912 thereafter comprises generating a connection check output decision based on an output of the comparison at step 910. The connection check output decision may comprise a "match decision" or a "non-match decision". In an embodiment, the connection check output decision is a "match decision" if (in a case where the first field device identifier is translated using translation data and the translated first field device identifier is compared against the second field device identifier) a translated first field device identifier is determined to match with the second field device identifier or alternately if (in a case where the second field device identifier is translated using translation data and the translated second field device identifier is compared against the first field device identifier) a first field device identifier is found to match with the translated second field device identifier or alternately if (in the case where both of the first field device identifier and the second field device identifier are translated using translation data and the translated first field device identifier is compared against the translated second field device identifier) a translated first field device identifier is determined to match with a translated second field device identifier. In another embodiment, the connection check output decision is a "non-match decision" if a translated first field device identifier is determined as not matching with the second field device identifier or alternately if a first field device identifier is determined as not matching with the translated second field device identifier.

Figure 9B:
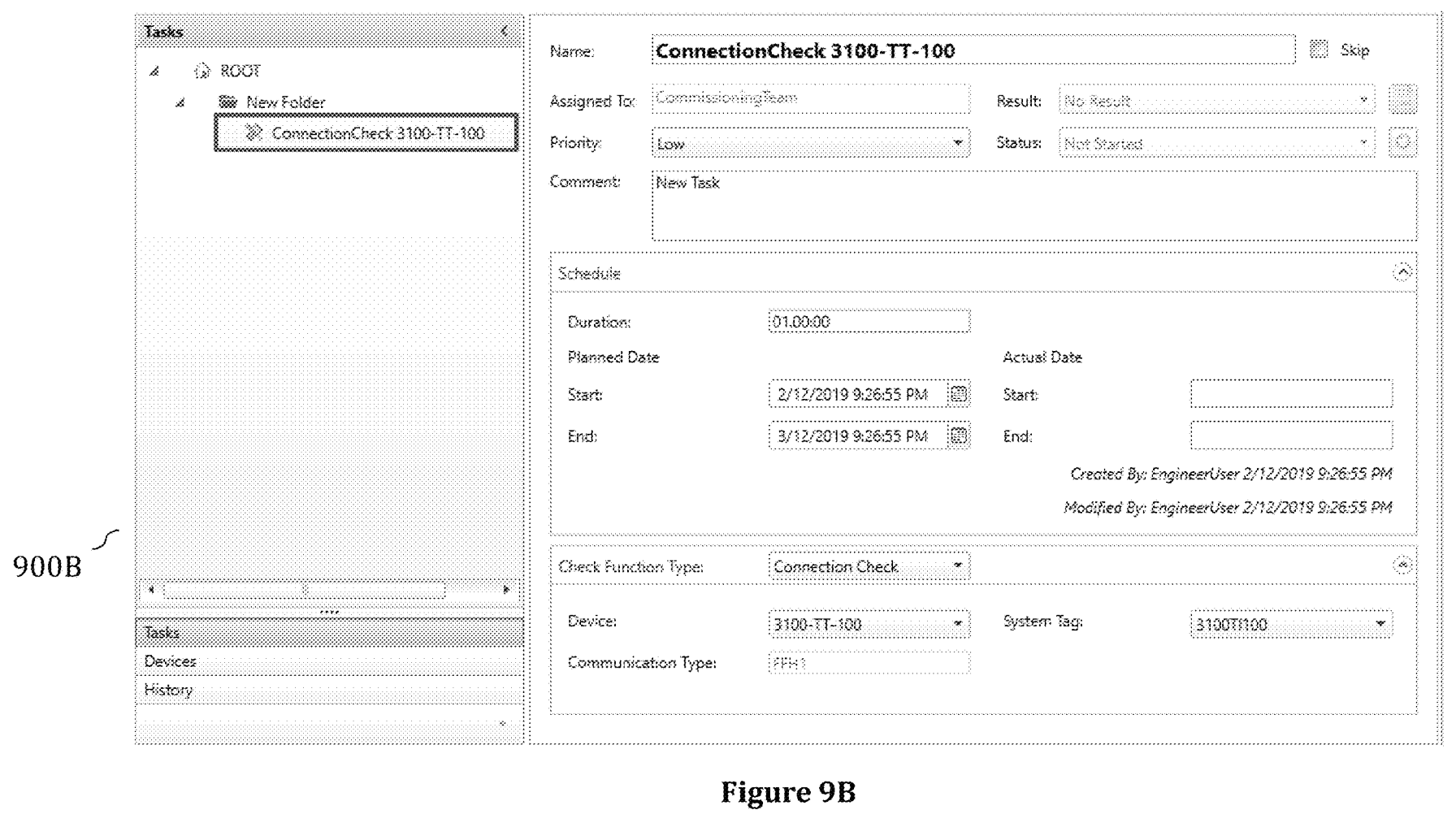

FIG. 9B illustrates an exemplary user interface 900B for implementing the step of connection checking, in accordance with an embodiment of the method steps of FIG. 9A. In the exemplary illustration of FIG. 9B, the control system has detected a field device having a physical device tag "3100-TT-100" that has been connected to an I/O port. The I/O port has a corresponding system tag "3100TI100" that has been assigned to a software function block or software control module associated with the I/O port, and the interface illustrated in FIG. 9B enables a comparison of the two, and generation of a connection check output decision, in accordance with the teachings of the methods of FIGS. 4 and 9 that are discussed above.

Figure 10:
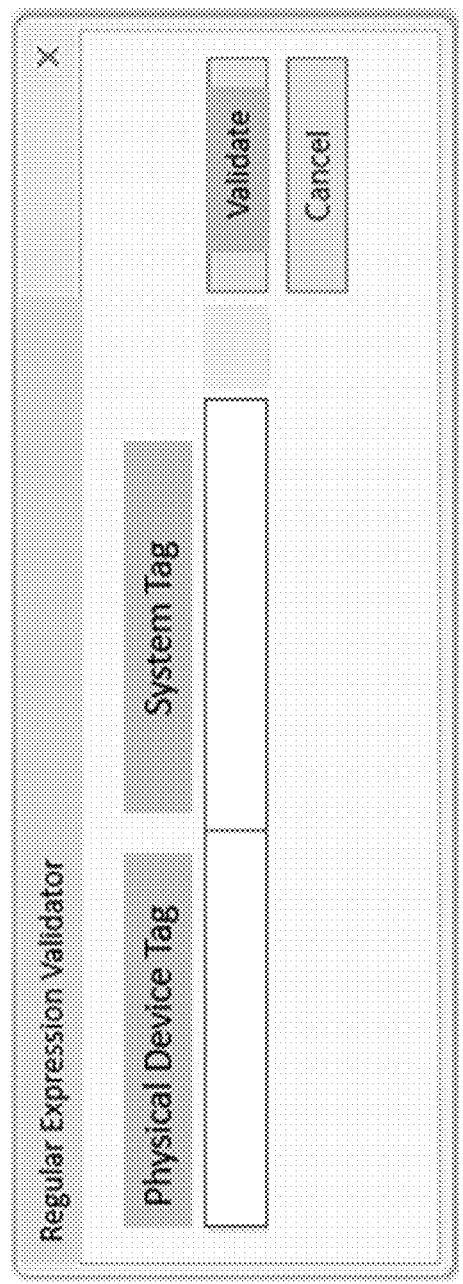
FIG. 10 illustrates an exemplary interface for comparing a physical device tag and a system device tag corresponding to a particular I/O port.

FIG. 10 illustrates an alternative exemplary user interface 1000 for comparing a physical device tag and a system device tag corresponding to a particular I/O port, in accordance with the method steps of FIG. 4 and/or FIG. 9. For the purposes of utilizing the user interface 1000, a physical device tag for a field device that has been connected to an I/O port, and the system tag corresponding to the I/O port are both entered under their respective form fields within interface 1000 and the validate function is implemented by selecting an action button that is labelled "validate". Responsive to initiation of the "validate" function, the control system searches the predefined mapping data for a mapping data record that matches the physical device tag, and translates the physical device tag before comparing it against the system tag to determine whether the physical device tag matches the corresponding system tag for that particular I/O port. It would however be understood that as an alternative, the control system could also search the predefined mapping data for a mapping data record that matches the system tag, and thereafter translate the system tag before comparing it against the physical device tag to determine whether the physical device tag matches the corresponding system tag for that particular I/O port.

Figure 12:
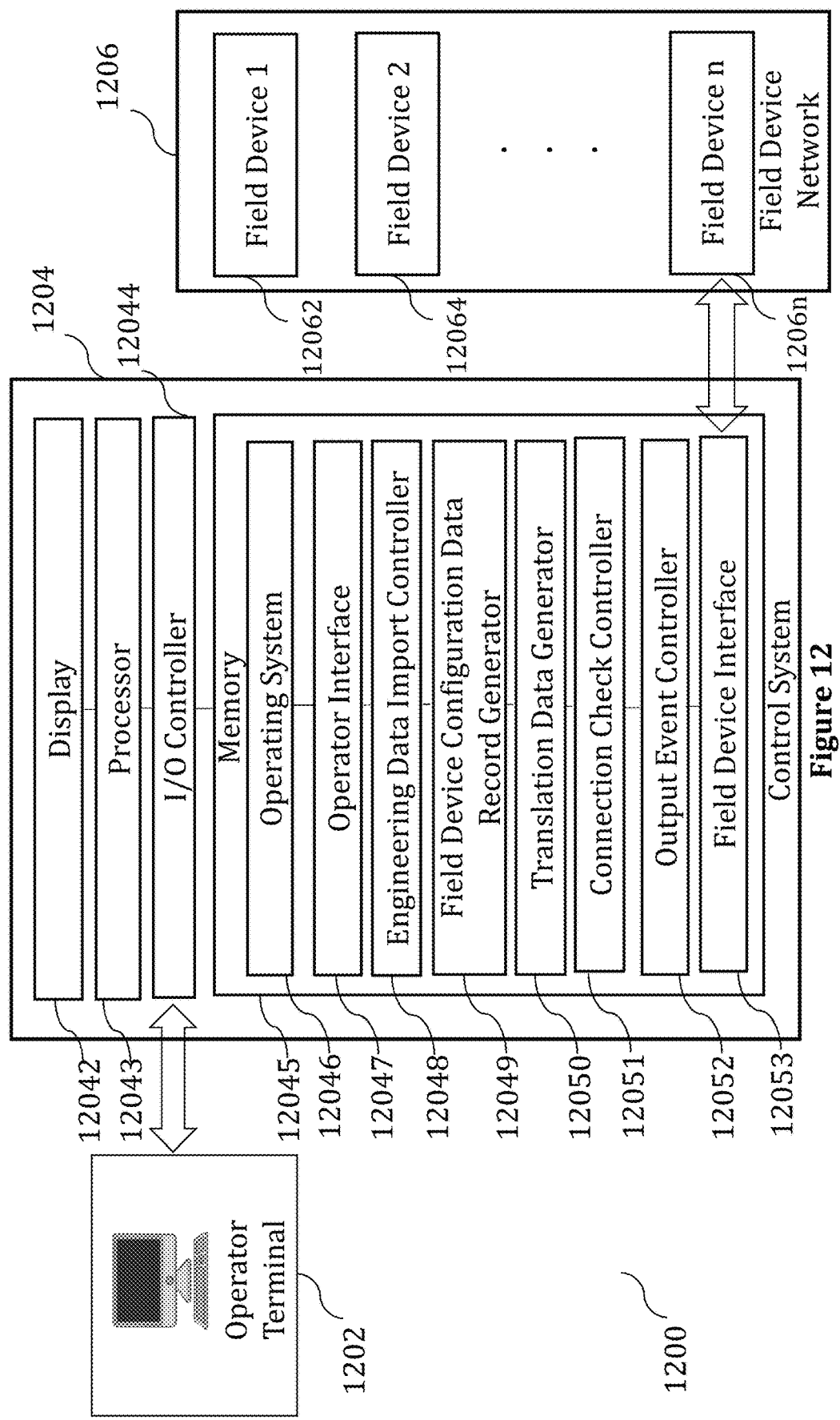
FIG. 12 illustrates a process control environment configured in accordance with the teachings of the present invention.

FIG. 12 illustrates a process control environment configured in accordance with the teachings of the present invention.

Process control environment 1200 comprises operator terminal 1202, control system 1204 and field device network 1206.

Operator terminal 1202 comprises any processor implemented terminal device or client device communicably coupled with control system 1204, and that is configured to enable an operator to transmit instructions to and receive data from control system 1204.

Field device network 1206 comprises a plurality of field devices communicably coupled with plant resource management server 1004. In FIG. 12, field device network 1206 comprises field device 1 (12062), field device 2 (12064) up to field device n (1206n). Field devices 12062 up to 1206n within field device network 1206 may include any of valves, valve actuators, switches, transmitters, or other sensor devices that may be located within an industrial process environment, and that may be configured for physical or process control functions.

Control system 1204 comprises one or more processor implemented servers that is positioned as a communication intermediary between operator terminal 1202 and field device network 1206.

Control system 1204 may include (i) a display 12042, (ii) a processor 12043 configured for data processing operations within control system 1204, (iii) an I/O controller 12044 configured to enable input-output functionality associated with control system 1204, and (iv) a memory 12045, which memory 10045 include transitory memory and/or non-transitory memory.

In an embodiment, memory 12045 may have stored therewithin, (i) an operating system 12046 configured for managing device hardware and software resources and that provides common services for software programs implemented within control system 1204, (ii) an operator interface 12047 configured to enable an operator to configure or control the control system 1204, (iii) an engineering data import controller 12048 configured to import/retrieve engineering data (based on which the control system has been configured) from an engineering data repository that is coupled with control system 1204, in accordance with method step 402 of FIG. 4, (iv) a field device configuration data record generator 12049 configured to generate field device configuration data for one or more I/O ports or I/O cards coupled with control system 1204, in accordance with method step 406 of FIG. 4, (v) a translation data generator 12050 configured to generate translation data for mapping of physical device tags with corresponding system tag, in accordance with method step 406 of FIG. 4, (vi) a connection check controller 12051 configured for implementing a connection check for one or more field devices that have been coupled with I/O ports or I/O cards of control system 1204, based on method step 410 of FIG. 4 and/or the method steps of FIG. 9, (vii) an output event controller 12052 configured for initiating a connection check output event for one or more field devices that have been subjected to a connection check, in accordance with method step 412 of FIG. 4, and (viii) a field device interface 12053 configured to enable data communication and control communications between control system 1204 and field device network 1206 and/or individual field devices 12062 to 1206n therewithin.

Figure 13:
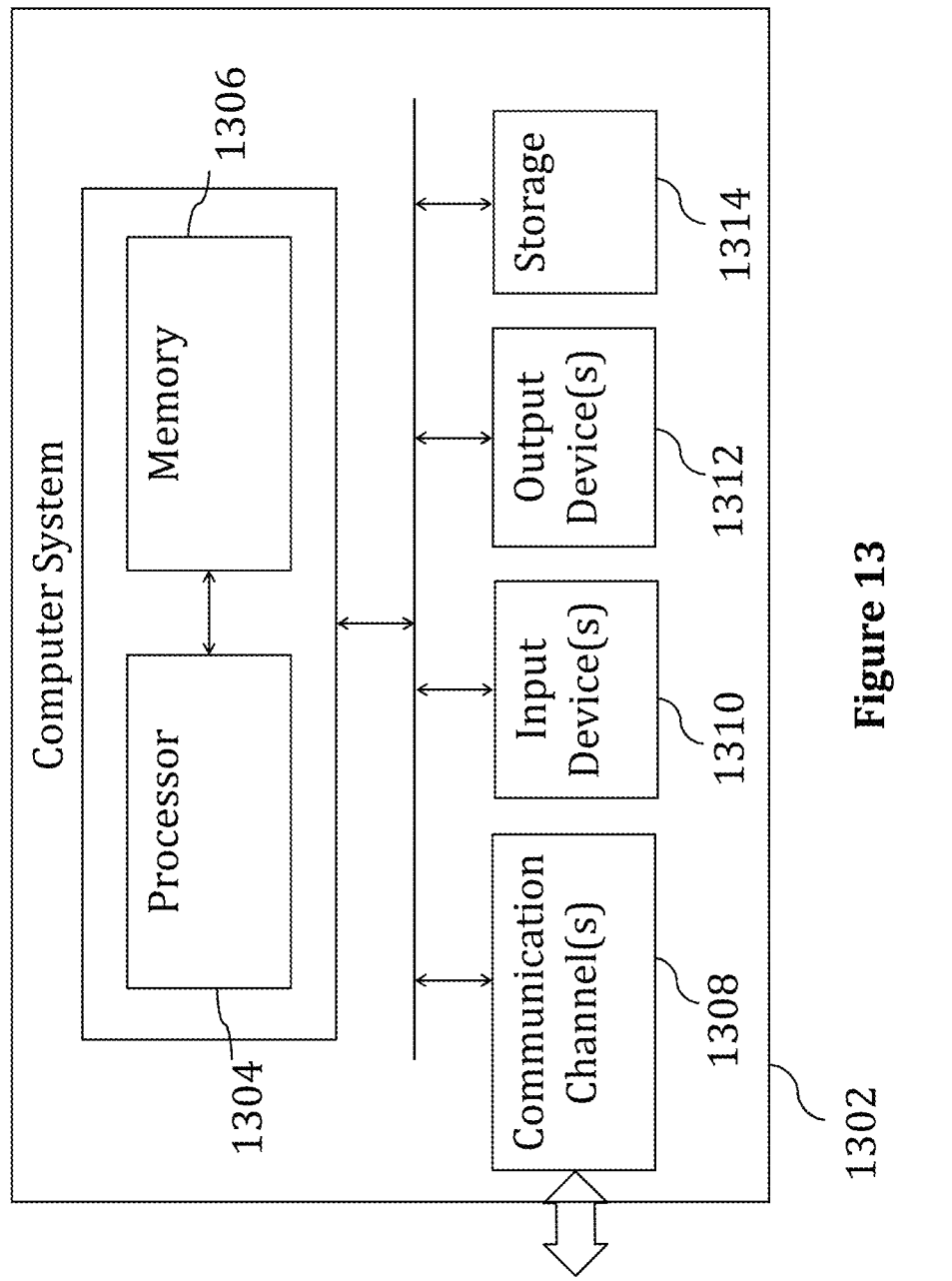
FIG. 13 illustrates an exemplary computer system according to which various embodiments of the present invention may be implemented.

FIG. 13 illustrates an exemplary computer system according to which various embodiments of the present invention may be implemented.

System 1300 includes computer system 1302 which in turn comprises one or more processors 1304 and at least one memory 1306. Processor 1304 is configured to execute program instructions—and may be a real processor or a virtual processor. It will be understood that computer system 1302 does not suggest any limitation as to scope of use or functionality of described embodiments. The computer system 1302 may include, but is not limited to, one or more of a general-purpose computer, a programmed microprocessor, a micro-controller, an integrated circuit, and other devices or arrangements of devices that are capable of implementing the steps that constitute the method of the present invention. Exemplary embodiments of a computer system 1302 in accordance with the present invention may include one or more servers, desktops, laptops, tablets, smart phones, mobile phones, mobile communication devices, tablets, phablets and personal digital assistants. In an embodiment of the present invention, the memory 1306 may store software for implementing various embodiments of the present invention. The computer system 1302 may have additional components. For example, the computer system 1302 may include one or more communication channels 1308, one or more input devices 1310, one or more output devices 1312, and storage 1314. An interconnection mechanism (not shown) such as a bus, controller, or network, interconnects the components of the computer system 1302. In various embodiments of the present invention, operating system software (not shown) provides an operating environment for various softwares executing in the computer system 1302 using a processor 1304, and manages different functionalities of the components of the computer system 1302.

The communication channel(s) 1308 allow communication over a communication medium to various other computing entities. The communication medium provides information such as program instructions, or other data in a communication media. The communication media includes, but is not limited to, wired or wireless methodologies implemented with an electrical, optical, RF, infrared, acoustic, microwave, Bluetooth or other transmission media.

The input device(s) 1310 may include, but is not limited to, a touch screen, a keyboard, mouse, pen, joystick, trackball, a voice device, a scanning device, or any another device that is capable of providing input to the computer system 1302. In an embodiment of the present invention, the input device(s) 1310 may be a sound card or similar device that accepts audio input in analog or digital form. The output device(s) 1312 may include, but not be limited to, a user interface on CRT, LCD, LED display, or any other display associated with any of servers, desktops, laptops, tablets, smart phones, mobile phones, mobile communication devices, tablets, phablets and personal digital assistants, printer, speaker, CD/DVD writer, or any other device that provides output from the computer system 1302.

The storage 1314 may include, but not be limited to, magnetic disks, magnetic tapes, CD-ROMs, CD-RWs, DVDs, any types of computer memory, magnetic stripes, smart cards, printed barcodes or any other transitory or non-transitory medium which can be used to store information and can be accessed by the computer system 1302. In various embodiments of the present invention, the storage 1314 may contain program instructions for implementing any of the described embodiments.

In an embodiment of the present invention, the computer system 1302 is part of a distributed network or a part of a set of available cloud resources.

The present invention may be implemented in numerous ways including as a system, a method, or a computer program product such as a computer readable storage medium or a computer network wherein programming instructions are communicated from a remote location.

The present invention may suitably be embodied as a computer program product for use with the computer system 1302. The method described herein is typically implemented as a computer program product, comprising a set of program instructions that is executed by the computer system 1302 or any other similar device. The set of program instructions may be a series of computer readable codes stored on a tangible medium, such as a computer readable storage medium (storage 1314), for example, diskette, CD-ROM, ROM, flash drives or hard disk, or transmittable to the computer system 1302, via a modem or other interface device, over either a tangible medium, including but not limited to optical or analogue communications channel(s) 1308. The implementation of the invention as a computer program product may be in an intangible form using wireless techniques, including but not limited to microwave, infrared, Bluetooth or other transmission techniques. These instructions can be preloaded into a system or recorded on a storage medium such as a CD-ROM, or made available for downloading over a network such as the Internet or a mobile telephone network. The series of computer readable instructions may embody all or part of the functionality previously described herein.

Based on the above, it would be apparent that the present invention offers significant advantages. In particular, the invention enables checking not just of whether a field device has been physically connected or detected at an I/O port, but also enables verification that the connected field device has been coupled to the correct I/O port, and that it has therefore been correctly coupled or linked with the software function block or software control module that has been configured to properly control such device. This has been found to significantly reduce or even entirely eliminate the likelihood that a field device connected to an I/O port is in fact a field device that was not intended or designed to be connected to that particular I/O port—and which is therefore incapable of being properly monitored or controlled by the software function block or software control module that controls that particular I/O port. The invention accordingly also avoids the time and cost consequences of having to trace and rectify incorrect device placement or connections after the pre-commissioning or commissioning stages, and also enables avoiding of any adverse consequences that could arise out of an incorrect field device being coupled to a particular I/O port.

While the exemplary embodiments of the present invention are described and illustrated herein, it will be appreciated that they are merely illustrative. It will be understood by those skilled in the art that various modifications in form and detail may be made therein without departing from or offending the spirit and scope of the invention as defined by the appended claims. Additionally, the invention illustratively disclose herein suitably may be practiced in the absence of any element which is not specifically disclosed herein—and in a particular embodiment that is specifically contemplated, the invention is intended to be practiced in the absence of any one or more element which are not specifically disclosed herein.

The invention claimed is:

1. A method for commissioning field devices within a control system that comprises at least one server and a plurality of input-output (I/O) ports communicably coupled with the server, the method comprising:
    detecting a connection event comprising a field device interfacing with an I/O port that is communicably coupled with the server;
    retrieving from a memory of the field device that is interfacing with the I/O port, a first field device identifier corresponding to the field device;
    retrieving from a non-transient memory database communicably coupled with the server, field device configuration data associated with the I/O port, the field device configuration data identifying a set of field device attributes, wherein:
        the set of field device attributes includes a second field device identifier; and
        at least a segment of the second field device identifier is different from a corresponding segment of the first field device identifier;
    generating one or both of a translated first field device identifier and a translated second field device identifier, based on predefined translation data; and
    initiating generation of an alert on a user interface responsive to determining that (i) the translated first field device identifier does not match the second field device identifier, or (ii) the translated second field device identifier does not match the first field device identifier, or (iii) the translated first field device identifier does not match the translated second field device identifier.

2. The method as claimed in claim 1, further comprising implementing a rectification action in response to determining that the translated first field device identifier does not match the second field device identifier or that the translated second field device identifier does not match the first field device identifier, wherein the rectification action includes any of:
    updating or modifying a first field device identifier within a local memory of the field device interfacing with the I/O port; or
    decoupling from the I/O port, the field device that has been interfacing with said I/O port; or
    coupling at the I/O port, another field device having a first field device identifier that matches the second field device identifier, in the place of the field device that has been interfacing with said I/O port.

3. The method as claimed in claim 1, wherein the field device configuration data is a subset of engineering data, design data or design specifications corresponding to the control system.

4. The method as claimed in claim 3, wherein the field device configuration data identifies a set of field device attributes corresponding to a specified field device that has been identified for interfacing with the I/O port.

5. The method as claimed in claim 1, wherein the connection event comprises coupling of the field device with the I/O port.

6. The method as claimed in claim 1, wherein the predefined translation data comprises a translation table or a translation rule.

7. The method as claimed in claim 6, wherein:
    generating the translated first field device identifier includes transforming the first field device identifier based on application of the translation table or translation rule to said first field device identifier.

8. The method as claimed in claim 6, wherein:
    generating the translated second field device identifier includes transforming the second field device identifier based on application of the translation table or translation rule to said second field device identifier.

9. The method as claimed in claim 6, wherein the predefined translation data comprises a translation rule for translating a physical device tag or a system tag that is represented by a first expression, to a second expression.

10. The method as claimed in claim 6, wherein:
    the predefined translation data comprises a translation table, that maps a first set of alphabetical, numeric or alphanumeric strings with a second set of alphabetical, numeric or alphanumeric strings; and
    translating a first field device identifier or a second field device identifier based on the translation table, includes (i) identifying within the translation table, a mapping record that enables translation of at least a segment of the first field device identifier or second field device identifier from a first expression to a second expression, and (ii) substituting a segment of said first field device identifier or second field device identifier that matches an identified first alphabetical, numeric, or alphanumeric strings within identified mapping record, with a second alphabetical, numeric, or alphanumeric string that is mapped to the first alphabetical, numeric, or alphanumeric string within the identified mapping record.

11. The method as claimed in claim 6, wherein:
    the predefined translation data comprises a translation table, that maps a first set of alphabetical, numeric, or alphanumeric strings that includes one or more than one sub-sets of wild cards with a second set of alphabetical, numeric, or alphanumeric strings that also include one or more than one sub-sets of wild cards;
    a translated first field device identifier is generated based on the first field device identifier; and
    a translated second field device identifier is generated based on the second field device identifier;
    wherein translating each of the first field device identifier and the second field device identifier includes (i) identifying within the translation table, a mapping record that enables translation of at least a segment of said first field device identifier or said second field device identifier from a first expression to a second expression, and (ii) substituting one or more non-wildcard segment(s) of said first field device identifier or said second field device identifier that matches a first non-wildcard segment within a first alphabetical, numeric, or alphanumeric strings within the identified mapping record, with one or more non-wildcard segment(s) within a second alphabetical, numeric, or alphanumeric string that is mapped to the first alphabetical, numeric, or alphanumeric string within the identified mapping record.

12. A system for commissioning field devices within a control system that comprises at least one server and a plurality of input-output (I/O) ports communicably coupled with the server, the system for commissioning field devices comprising:
a memory; and
at least one processor, configured for:
  detecting a connection event comprising a field device interfacing with an I/O port that is communicably coupled with the server;
  retrieving from a memory of the field device that is interfacing with the I/O port, a first field device identifier corresponding to the field device;
  retrieving from a non-transient memory database communicably coupled with the server, field device configuration data associated with the I/O port, the field device configuration data identifying a set of field device attributes, wherein:
    the set of field device attributes includes a second field device identifier; and
    at least a segment of the second field device identifier is different from a corresponding segment of the first field device identifier;
  generating one or both of a translated first field device identifier and a translated second field device identifier, based on predefined translation data; and
  initiating generation of an alert on a user interface responsive to determining that (i) the translated first field device identifier does not match the second field device identifier, or (ii) the translated second field device identifier does not match the first field device identifier, or (iii) the translated first field device identifier does not match the translated second field device identifier.

13. The system as claimed in claim 12, wherein the at least one processor is configured to implement a rectification action in response to determining that the translated first field device identifier does not match the second field device identifier or that the translated second field device identifier does not match the first field device identifier, wherein the rectification action includes any of:
  updating or modifying a first field device identifier within a local memory of the field device interfacing with the I/O port; or
  decoupling from the I/O port, the field device that has been interfacing with said I/O port; or
  coupling at the I/O port, another field device having a first field device identifier that matches the second field device identifier, in the place of the field device that has been interfacing with said I/O port.

14. The system as claimed in claim 12, wherein the field device configuration data is a subset of engineering data, design data or design specifications corresponding to the control system.

15. The system as claimed in claim 14, wherein the field device configuration data identifies a set of field device attributes corresponding to a specified field device that has been identified for interfacing with the I/O port.

16. The system as claimed in claim 12, wherein the connection event comprises coupling of the field device with the I/O port.

17. The system as claimed in claim 12, wherein the predefined translation data comprises a translation table or a translation rule.

18. The system as claimed in claim 17, wherein:
generating the translated first field device identifier includes transforming the first field device identifier based on application of the translation table or translation rule to said first field device identifier.

19. The system as claimed in claim 17, wherein:
generating the translated second field device identifier includes transforming the second field device identifier based on application of the translation table or translation rule to said second field device identifier.

20. The system as claimed in claim 17, wherein the predefined translation data comprises a translation rule for translating a physical device tag or a system tag that is represented by a first expression, to a second expression.

21. The system as claimed in claim 17, wherein:
the predefined translation data comprises a translation table, that maps a first set of alphabetical, numeric, or alphanumeric strings with a second set of alphabetical, numeric, or alphanumeric strings; and
translating a first field device identifier or a second field device identifier based on the translation table, includes (i) identifying within the translation table, a mapping record that enables translation of at least a segment of the first field device identifier or second field device identifier from a first expression to a second expression, and (ii) substituting a segment of said first field device identifier or second field device identifier that matches an identified first alphabetical, numeric, or alphanumeric strings within identified mapping record, with a second alphabetical, numeric, or alphanumeric string that is mapped to the first alphabetical, numeric, or alphanumeric string within the identified mapping record.

22. The system as claimed in claim 17, wherein:
the predefined translation data comprises a translation table, that maps a first set of alphabetical, numeric, or alphanumeric strings that includes one or more than one sub-sets of wild cards with a second set of alphabetical, numeric, or alphanumeric strings that also include one or more than one sub-sets of wild cards;
a translated first field device identifier is generated based on the first field device identifier; and
a translated second field device identifier is generated based on the second field device identifier;
wherein translating each of the first field device identifier and the second field device identifier includes (i) identifying within the translation table, a mapping record that enables translation of at least a segment of said first field device identifier or said second field device identifier from a first expression to a second expression, and (ii) substituting one or more non-wildcard segment(s) of said first field device identifier or said second field device identifier that matches a first non-wildcard segment within a first alphabetical, numeric, or alphanumeric strings within the identified mapping record, with one or more non-wildcard segment(s) within a second alphabetical, numeric, or alphanumeric string that is mapped to the first alphabetical, numeric, or alphanumeric string within the identified mapping record.

23. A computer program product for commissioning field devices within a control system that comprises at least one server and a plurality of input-output (I/O) ports communicably coupled with the server, the computer program product comprising a nontransitory computer usable medium having a computer readable program code embodied therein, the computer readable program code comprising instructions for implementing within a processor based computing system, the steps of:

detecting a connection event comprising a field device interfacing with an I/0 port that is communicably coupled with the server;

retrieving from a memory of the field device that is interfacing with the I/0 port, a first field device identifier corresponding to the field device;

retrieving from a non-transient memory database communicably coupled with the server, field device configuration data associated with the I/0 port, the field device configuration data identifying a set of field device attributes, wherein:

the set of field device attributes includes a second field device identifier; and at least a segment of the second field device identifier is different from a corresponding segment of the first field device identifier;

generating one or both of a translated first field device identifier and a translated second field device identifier, based on predefined translation data; and initiating generation of an alert on a user interface responsive to determining that (i) the translated first field device identifier does not match the second field device identifier, or (ii) the translated second field device identifier does not match the first field device identifier, or (iii) the translated first field device identifier does not match the translated second field device identifier.

\* \* \* \* \*